(12) United States Patent
Pande et al.

(10) Patent No.: US 8,195,008 B2
(45) Date of Patent: Jun. 5, 2012

(54) METHOD AND SYSTEM FOR PROCESSING VIDEO DATA IN A MULTIPIXEL MEMORY TO MEMORY COMPOSITOR

(75) Inventors: Anand Pande, Bangalore (IN); Darren Neuman, Palo Alto, CA (US)

(73) Assignee: Broadcom Corporation, Irvine, CA (US)

( * ) Notice: Subject to any disclaimer, the term of this patent is extended or adjusted under 35 U.S.C. 154(b) by 1368 days.

(21) Appl. No.: 11/770,230

(22) Filed: Jun. 28, 2007

(65) Prior Publication Data

US 2009/0003730 A1    Jan. 1, 2009

(51) Int. Cl.
*G06K 9/32*    (2006.01)
(52) U.S. Cl. ............... 382/298; 345/7; 348/36; 348/445
(58) Field of Classification Search ........................ None
See application file for complete search history.

(56) References Cited

U.S. PATENT DOCUMENTS

| | | | | |
|---|---|---|---|---|
| 6,396,505 | B1 * | 5/2002 | Lui et al. | 345/613 |
| 7,941,001 | B1 * | 5/2011 | Sahu et al. | 382/298 |
| 2002/0001348 | A1 * | 1/2002 | Yiwen et al. | 375/240.26 |
| 2005/0248596 | A1 * | 11/2005 | Smith et al. | 345/698 |

* cited by examiner

*Primary Examiner* — Kaveh Abrishamkar
(74) *Attorney, Agent, or Firm* — Thomas, Kayden, Horstemeyer & Risley, LLP

(57) ABSTRACT

A method and system for processing video data using multipixel scaling in a memory system are provided. The multipixel scaling may include reading pixel data for one or more data streams from the memory system into one or more scalers, wherein each of the plurality of data streams includes a plurality of pixels, scaling the pixel via the one or more scalers and outputting the scaled pixels from the one or more scalers. Pixel data may be sequential or parallel. The plurality of scalers may be in parallel, scaling sequential pixel data with independent phase control, or scaling parallel pixel data in substantially equal phase. Pixel data may be transposed, replicated, distributed and aligned prior to reading by scalers, and may be aligned merged and transposed after scaling. Scaling may include interpolation or sub sampling using pixel phase, position, step size and scaler quantities.

30 Claims, 15 Drawing Sheets

METHOD AND SYSTEM FOR PROCESSING VIDEO DATA IN A MULTIPIXEL MEMORY TO MEMORY COMPOSITOR

CROSS-REFERENCE TO RELATED APPLICATIONS/INCORPORATION BY REFERENCE

Not Applicable

FIELD OF THE INVENTION

Certain embodiments of the invention relate to processing of video data. More specifically, certain embodiments of the invention relate to a method and system for processing video data in a multi-pixel memory to memory compositor.

BACKGROUND OF THE INVENTION

Motion pictures, video and digital photography use compositing to alter image quality or create visual effects by combining images from different sources. Images and colors may be altered by manipulating pixels through color conversion, keying, scaling and blending operations. Compositing is used extensively in modern film, television and photography to achieve effects that otherwise would be difficult or not cost-efficient. One common use for compositing is to shoot on a relatively small set and create the impression of a significantly different location by adding additional surrounding and foreground imagery. A common tool to help facilitate composites is using a blue or green backdrop of a uniformly solid color that is placed behind an actor or object. During compositing, all areas of a frame with that color are removed and replaced, allowing the compositor to place the isolated image of the actor or object in front of a separately shot or synthetic background.

Compositing technique is commonly done using digital techniques. One of the known digital techniques is a raster operation (ROP) where changes of image graphics may be transitioned smoothly by compositing the source image data to the destination image data through programming a ROP table. A digital image may be reproduced by clustering pixels or dots of varying intensity and color, forming a raster graphics image. A colored raster graphic image will usually have pixels with between one and eight bits for each of the basic colors red, green, and blue components (R, G, B). By using red, green and blue intensities, many color combinations can be represented. Typical display adapters may use up to 24 bits of information for each pixel. This is usually apportioned with 8 bits each for red, green and blue, giving a range of 256 possible values, or intensities, for each hue. With this system, ($256^3$ or $2^{24}$) discrete combinations of hue and intensity may be specified.

With the need for compositing images comes a variant of RGB which includes an extra 8 bit channel for transparency, thus resulting in a 32 bpp format. The transparency channel is commonly known as the alpha channel, so the format is named RGBA. Since the RGBA does not change anything in the RGB model, it is not a distinct color model. The RGBA is a file format which integrates transparency information along with the color information in the same file. This allows for alpha blending of the image over another, and is a feature of the PNG format.

In graphics and visual effects, keying is an informal term for compositing two full frame images together, by discriminating the visual information into values of color and light. Some of the common key types: chroma key, luma key, difference key and matte key. A chroma key is the removal of a color from one image to reveal another "behind" it. A luma key similarly replaces color from an image which falls into a particular range of brightness. This technique is less controllable, but may be used on graphic elements. It is particularly useful for realistic fire keying. A difference key uses a background plate of the scene that the foreground object is being keyed out of and the software then assesses the source video and any pixels that don't match the grid are obviously meant to be keyed out. For example, if your subject is standing in front of a wall, a photo taken from the camera of the same wall is used. This may be taken from the same camera angle, focus & distance. The software may then compare the video to be keyed with the original photo and generates a mask based upon that difference.

The quality of a raster graphic image is determined by the total number of pixels (resolution), and the amount of information in each pixel (often called color depth). For example, an image that stores 24 bits of color information per pixel can represent smoother degrees of shading than one that only stores 16 bits per pixel. Likewise, an image sampled at 640× 480 pixels (therefore containing 307,200 pixels) will look rough and blocky compared to one sampled at 1280×1024 (1,310,720 pixels).

Because it takes a large amount of data to store a high-quality image, data compression is used to reduce the memory size and may result in some loss of resolution in raster graphics image. The amount of memory space used by an uncompressed image is specified by the number of pixels in the image and the color depth to which each pixel may be specified. In a 24-bit image, each pixel may be specified by a 24-bit allocation of memory, so the amount of space required in bits is 24× the number of pixels. For example, a 24-bit image 640×480 pixels in size requires (24×640×480)/8=921, 600 bytes of memory.

Compositing two images of different sizes require scaling of one image to the other. Scaling is a non-trivial process that involves a trade-off between speed, smoothness and/or sharpness. Image scaling may involve either scale down by sub-sampling or zooming out (reducing or shrinking an image) or scale up by zooming in (enlarging an image). When increasing or reducing the size of images, the problem of processing efficiency becomes particularly evident because of the fact that digital images are composed of large number of pixels.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A method and system is provided for processing video data in a multi-pixel memory to memory compositor, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

Certain embodiments of the invention may be found in a method, system or program for processing video data in a multi-pixel memory to memory compositor. In an aspect of the invention, video data in the form of pixel data from the memory system may be read into one or more scalers for scaling. The read pixel data may comprise one or more data streams, each of which may comprise a plurality of pixels. The pixels may be scaled by one or more scalers with a scaling factor in a clock cycle and output to the memory to memory compositor system. The data streams may comprise sequential or parallel pixels. The sequential pixels may be processed by one or more horizontal scalers. Each of the sequential pixels may be replicated by a distributor control and aligned for horizontal scaling. The replicated and aligned pixels may be scaled using independent phase control interpolation where the interpolation is derived from a pixel phase value, a step size value and number of the horizontal scalers used. The scaled pixels may be merged by a merge control to create an output sequential data stream. The parallel pixels may be scaled in substantially equal phase by one or more vertical scalers.

Various embodiments to the invention may comprise using vertical scalers to perform horizontal scaling function or using horizontal scalers to perform vertical scaling function. This may be achieved by transposing the pixels before being read by the vertical or horizontal scalers. A symmetrically scaled image may be generated by a vertical scaling and a horizontal scaling process, or by one or more vertical scaling with one or more transposing pixels process, or a one or more horizontal scaling with one or more transposing pixels process. In an exemplary embodiment of the invention, a twice vertical scaling and twice transposing pixels process, or a twice horizontal scaling and twice transposing pixels process may be used for symmetrical scaling. In general, plurality of combinations of vertical scaling or horizontal scaling, using one or more transposed pixel processing may yield scaling to any desired aspect ratio.

Figure 1:
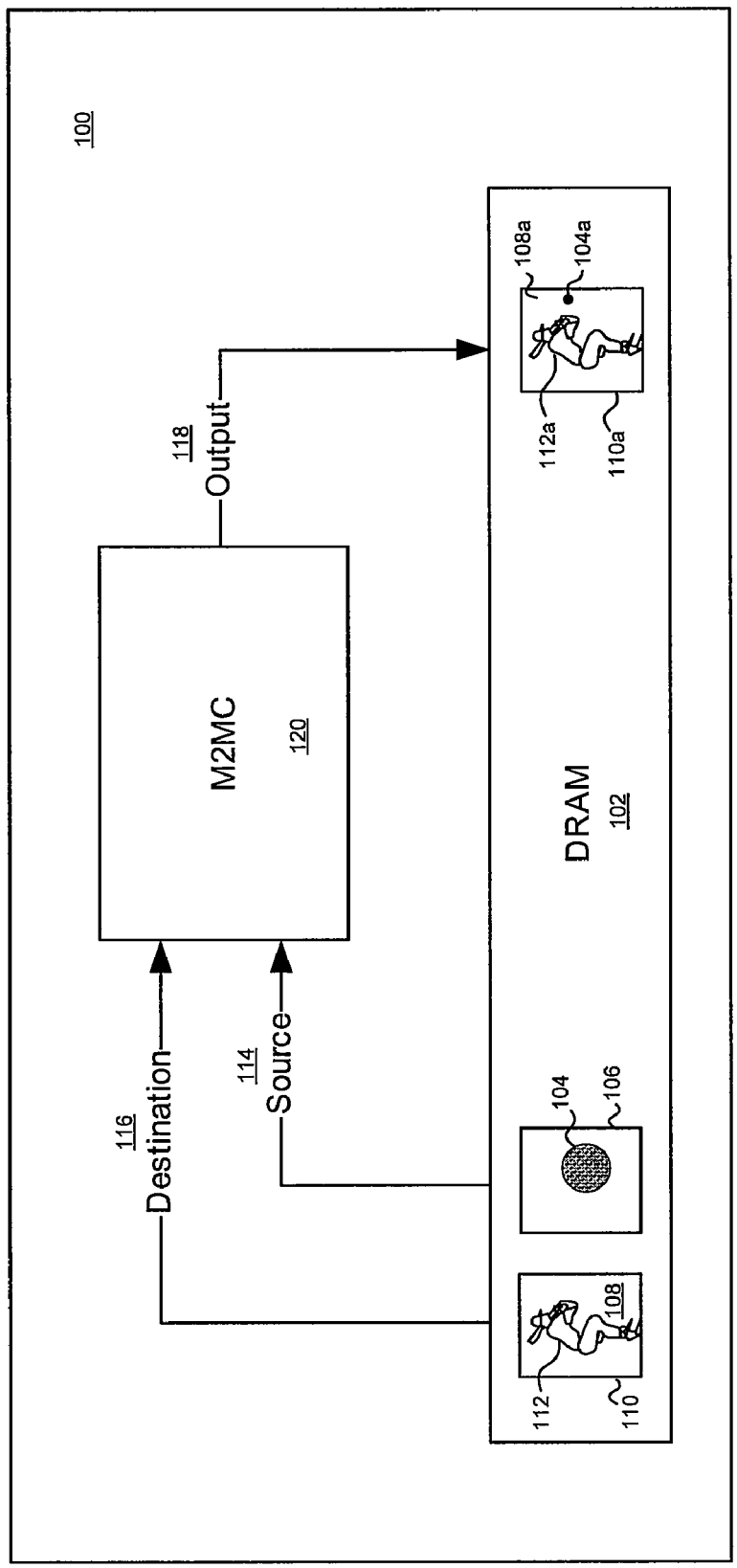
FIG. 1 is a block diagram illustrating an exemplary video data processing operation of a multi-pixel memory to memory compositor system, in accordance with an embodiment of the invention.

FIG. 1 is a block diagram illustrating an exemplary video data processing operation of a multi-pixel memory to memory compositor system, in accordance with an embodiment of the invention. Referring to FIG. 1, there is shown a multi-pixel memory to memory compositor system 100. The multi-pixel memory to memory compositor system 100 may comprise a memory system 102 and a memory to memory compositor (M2MC) 120.

The memory system 102 may be a DRAM, a flash memory or any suitable media storage that may be utilized for storing images such as a first image 106 and a second image 110 to be processed by the M2MC 120. The first image 106 may be a source image illustrated as a baseball 104 comprising pixel data 114. The second image 110 may be a destination image illustrated as a baseball player 112 with background 108 comprising pixel data 116.

The M2MC 120 may be viewed as a data-processing pipeline which may read and process the first and second images 106 and 110 respectively from the pixel data 114 and pixel data 116 as inputs and optionally composites first and second images 106 and 110 respectively into pixel data 118 as an output to be stored as an output image 110a in memory system 102. The output image 110a may be a composite image of an un-scaled baseball player 112a from the second image 110 with background 108a with a scaled down baseball 104a from the first image 108. The choice of scaling the first or second image may be interchangeable as long as one of the images is kept at a fixed scale as a dimensional reference for compositing. The M2MC 120 may read pixel data 114 and 116 and writes pixel data 118 to the memory system 102 in a real time/non-real time system.

In an embodiment of the invention, the pixel data 114 and 116 may comprise one or more data streams where each data stream may comprise a plurality of pixels. The throughput of the M2MC 120 may be increased by processing in parallel a plurality of input pixels. The parallel processing of pixels may be achieved vertically or horizontally according to various embodiments of the invention.

Figure 2:
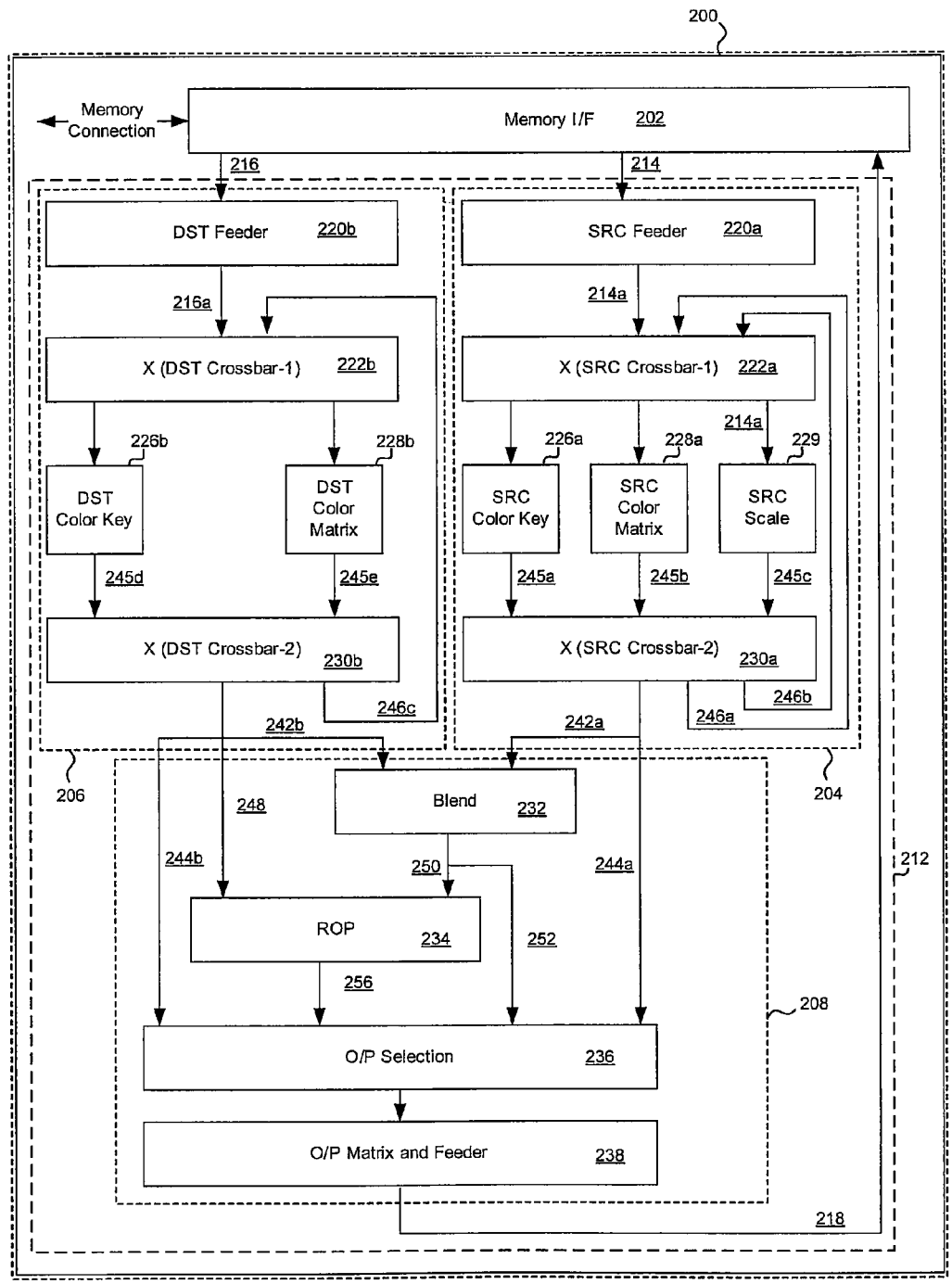
FIG. 2 is a block diagram illustrating exemplary functions in a multi-pixel memory to memory compositor system, in accordance with an embodiment of the invention.

FIG. 2 is a block diagram illustrating exemplary functions in a multi-pixel memory to memory compositor system, in accordance with an embodiment of the invention. Referring to FIG. 2, there is shown a multi-pixel memory to memory compositor system 200. The multi-pixel memory to memory compositor system 200 may comprise a memory system 202 previously described in FIG. 1 and a memory to memory compositor (M2MC) 212. The M2MC 212 may comprise a source module 204 for source image pixel data processing, a destination module 206 for destination image pixel data processing and a blend module 208 for pixel data compositing. The source module 204, destination module 206 and blend module 208 may form suitable logic, circuitry, and/or code that may enable control, management, and/or pixel data storage operations, for example.

The source module 204 for source image pixel data processing may comprise a source feeder 220a, a first source crossbar 222a, a color key block 226a, a color matrix block 228a, a scaling block 229 and a second source cross bar 230a. The destination module 206 for destination image pixel data processing may comprise a destination feeder 220b, a first destination crossbar 222b, a color key block 226b, a color matrix block 228b, and a second destination cross bar 230b. The blend module 208 for pixel data compositing may comprise a blend function block 232, a Raster operation block ROP 234, an output selection block 236 and an output matrix and feeder 238.

The source module 204 and the destination module 206 may operate in a somewhat similar manner except that no scaling operation may be performed in the destination module 206. The destination pixel data 216 may be used as a dimensional reference when compositing with the source pixel data 214 thus scaling may not be required in the destination module 206. In another embodiment, scaling may be performed in the destination module 206 similar to the source module 204.

The source feeder 220a and destination feeder 220b may each comprise a buffer for storing and shifting corresponding source pixel data 214 and destination pixel data 216 into the first source cross bar 222a and first destination cross bar 222b respectively. The first source cross bar 222a and the first destination cross bar 222b may each comprise a switch matrix to route the respective source pixel data 214 and the destination pixel data 216 for the next operations.

The color key blocks 226a and 226b may each operate with chroma key, luma key, difference key and matte key operations from respective inputs—the source input (first source cross bar 222a) or the destination input (first destination cross bar 222b). Keying operation may comprise compositing between two respective frames of images together (both source images or both destination images) and discriminating the visual information of respective source pixel data 214 or destination pixel data 216 into desired range of color and light.

The color matrix block 228a and 228b may perform color conversion to pixels input respectively from first source cross bar 222a and first destination cross bar 222b. Color conversion may be done by adjusting each respective pixel color on a 0 to 255 scale to attain consistency between source and destination pictures. For example: One of the pictures may be in YUV format while the other one may be in RGB format, so color matrix operation converts YUV to RGB (or vice versa) before they can be blended together. The scaling block 229 scales the source pixel data 214b inputs from the first source cross bar 222a. The scaling block 229 may comprise one or more vertical scalers or horizontal scalers where scaling of source pixel data 214b may be performed according to one or more scaling factors defined by a user input.

Similar to the first source cross bar 222a, the second source cross bar 230a may comprise a switch matrix to route the respective outputs 245a to 245c from the color key block 226a, color matrix block 228a or scaling block 229 to the next operation. In an embodiment of the invention, the pixel processing operations of color key block 226a, color matrix block 228a or scaling block 229 may be performed in any order to be defined in software programming.

In an instance, the source pixel data 214a may be programmed to be scaled in the scaling block 229 first, color key block 228a second and color matrix block 228a last. Hence, the second source cross bar 230a may direct source output pixel data 242a or 244a to the blending block 208. The output 245c of scaling block 229 may be returned to the first source cross bar 222a through output 246a for the next operation in the color key block 226a. The output 245a from the color key block 226a may be returned to the first source cross bar 222a through output 246b to complete the operation by the color matrix block 228a. Simultaneously the scaling block 229 and the color key block 226a may continue to read and process new pixel data 214b from the first source cross bar 222a to complete the pixel data operations in the source module 204.

Likewise, destination pixel data 216a may first be processed by color matrix block 228b to produce output 245e, where the second destination crossbar 230b may returned output 245e to the first destination cross bar 222b through output 246c for the next operation in color key block 226b. Simultaneously the color matrix block 228b may continue to read and process new pixel data 216a from the first source cross bar 222a for the subsequent pixel data operations in the destination module 206.

The blend module 208 for pixel data compositing may receive outputs 242a and 244a from the source module 204 and outputs 242b, 244b and 248 from the destination module 206. A plurality of compositing operations may be performed on the outputs from both the source module 204 and destination module 206. In a time instant, pixels from outputs 242a and 242b may super-imposed in the blend function block 232 to produce outputs 250 or 252.

In another time instant, a Raster operation in the Raster operation block ROP 234 may be performed on pixels from outputs 248 and 250 to achieve a smooth graphical transition effect. The output selection block 236 may select any combination of outputs 244a, 244b, 252 and 256 to perform a second color matrix operation at the output matrix and feeder 238 to produce an output 218 as completion of the multi-pixel module to module compositor operation. The output 218 may be stored in the memory system 202.

Figure 3:
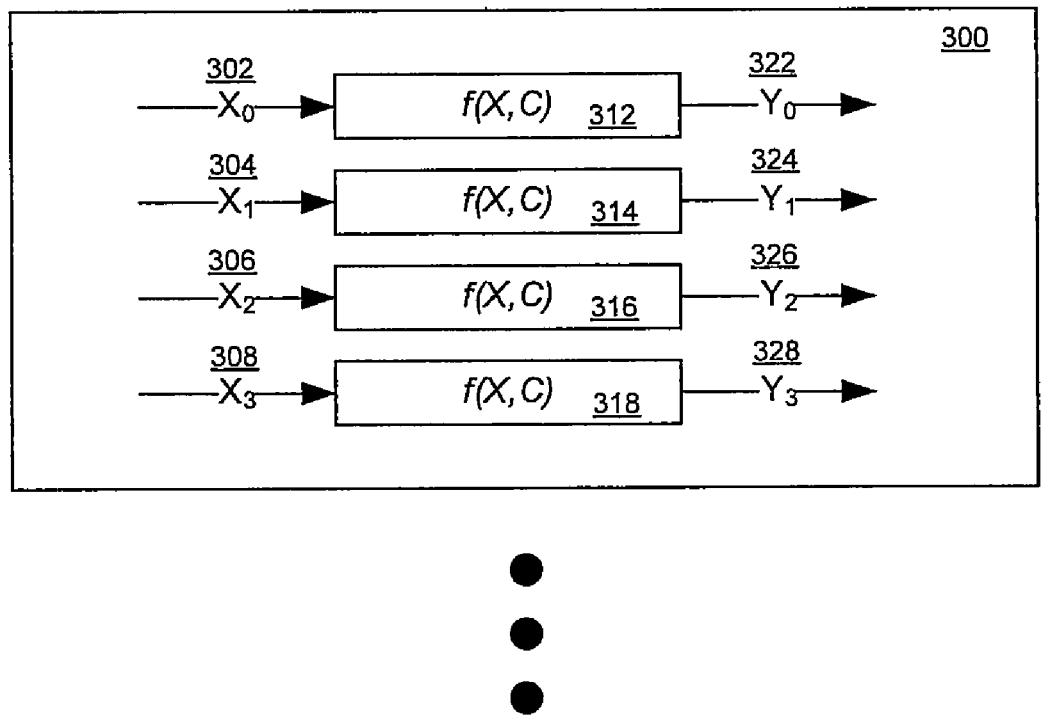
FIG. 3 is a block diagram that illustrates an exemplary parallel multi-pixel data processing block in a memory to memory compositor system, in accordance with an embodiment of the invention.

FIG. 3 is a block diagram that illustrates an exemplary parallel multi-pixel data processing block in a memory to memory compositor system, in accordance with an embodiment of the invention. Referring to FIG. 3, there is shown a parallel multi-pixel data processing block 300 comprising a plurality of pixel processing blocks 312 to 318 with pixel inputs $X_0$ 302 to $X_3$ 308 and corresponding pixel outputs $Y_0$ 322 to $Y_3$ 328. The plurality of pixel processing blocks 312 to 318 in parallel arrangement may perform operations such as color keying, color matrixing, blending, or ROP. The throughput of processing pixels data is proportionately increased.

Each of the pixel processing blocks 312 to 318 may be represented by one or more functional blocks within the memory to memory compositor (M2MC) 212 comprising color key block 226a, color matrix block 228a, blend function block 232, or ROP 234 shown in FIG. 2.

The value of the output pixel $Y_0$ 322 may depend on the value of one input pixel $X_0$ 302 only. For example, the output of the color-matrix may be described by the following relationship:

$$Y_n = f(X_n, C),$$

where: $X_n$ is the n-th pixel of input, C defines the transformation parameters, and $Y_n$ is the n-th pixel of the output The behavior of color-key, blend and ROP operations may also be described in a similar manner. For example, color-key operation may be defined with the above equation, if the parameter C specifies the range of colors to be keyed out.

Increasing the pixel processing throughput for these pixel processing blocks 312 to 318 (key, matrix, blend and ROP) is a simple matter of increasing the parallelism by using beyond pixel processing blocks 312 to 318. Each of the parallel data paths may be fed n-horizontally to adjacent input pixels ($X_0$, $X_1$, $X_2$, $X_3$) to processing blocks 312 to 318 to output respective n-adjacent pixels ($Y_0$, $Y_1$, $Y_2$, $Y_3$).

Figure 4A:
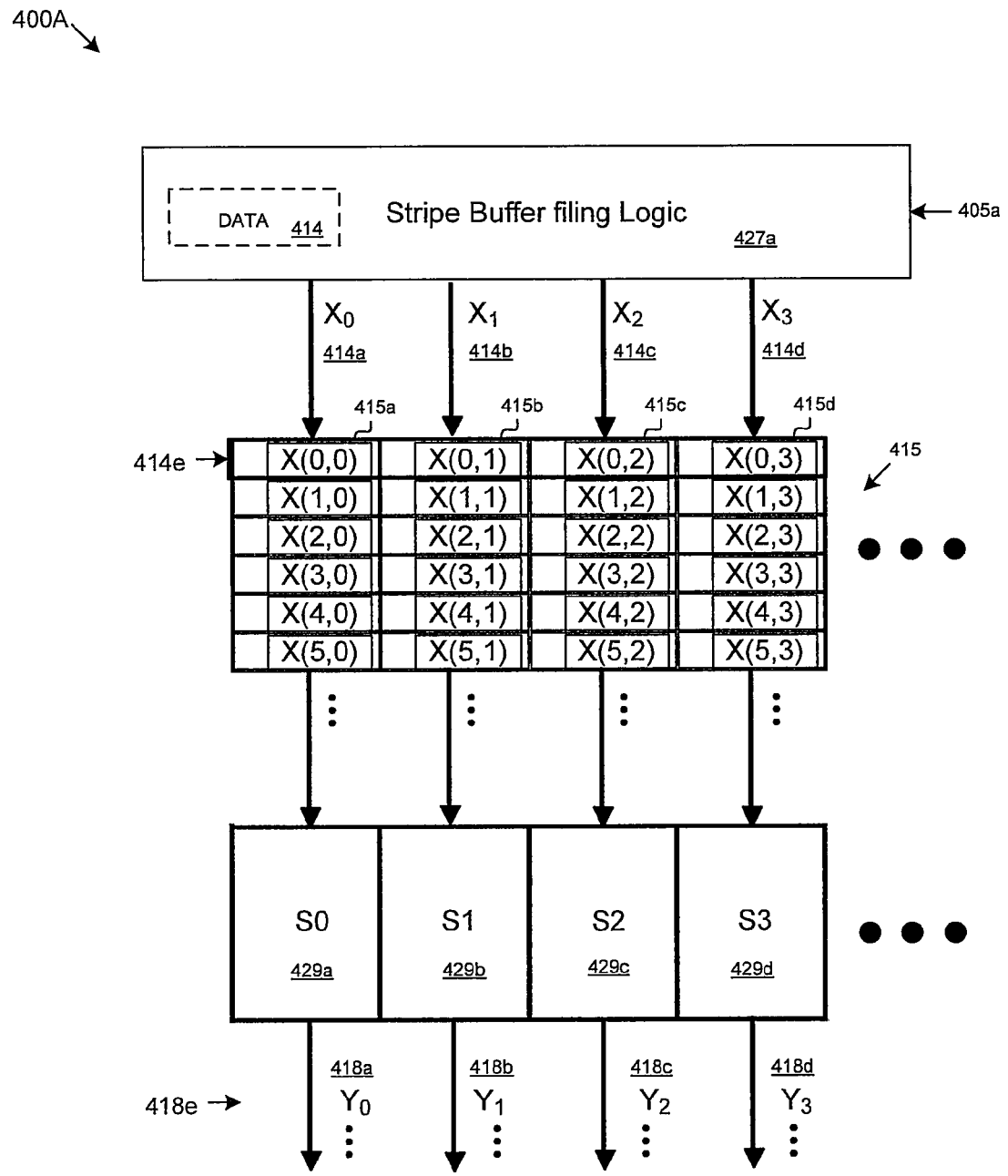
FIG. 4A is a block diagram that illustrates an exemplary vertical scaling in a multi-pixel memory to memory compositor system, in accordance with an embodiment of the invention.

FIG. 4A is a block diagram that illustrates an exemplary vertical scaling in a multi-pixel memory to memory compositor system 400A, in accordance with an embodiment of the invention. Referring to FIG. 4, there is shown in the multi-pixel memory to memory compositor system 400A comprising a stripe buffer filing logic (SBFL) 427a, a plurality of parallel pixel data streams $X_0$ 414a to $X_3$ 414d, a memory buffer 415m, a plurality of vertical scalers $S_0$ 429a to $S_3$ 429d and a plurality of respective parallel output pixel data streams $Y_0$ 418a to $Y_3$ 418d.

The stripe buffer filing logic (SBFL) 427a may comprise a memory buffer with suitable logic and circuits storing pixel data 414. The pixel data 414 in the memory buffer are logically partitioned for striping to a plurality of parallel pixel data streams $X_0$ 414a to $X_3$ 414d. The memory buffer may comprise flash memory, DRAM or any suitable memory storage with fast access time. The striping of pixel data 414 may be follow a first in first out (FIFO) distribution pattern or may be logically mapped according to a table. The striping of pixel data 414 may be managed or controlled by a controller or processor such as a phase accumulator and control (shown in FIG. 5) to partition pixel data 414 into the parallel pixel data streams $X_0$ 414a to $X_3$ 414d read by a plurality of vertical scalers $S_0$ 429a to $S_3$ 429d.

For example, the (SBFL) 427a may partition the pixel data 414 into four parallel pixel data streams $X_0$ 414a to $X_3$ 414d for vertical scaling. Each pixel data stream may represent a vertical section of an image of a picture (shown in FIG. 4C), in this example the picture may be partitioned into four sections for vertical scaling. A high number of partitions may represent more parallel processing.

Each of the pixel data streams $X_0$ 414a to $X_3$ 414d may carry chunks of pixel data to be processed. For example, pixel data streams $X_0$ 414a may comprise pixels $X_{0,0}$, $X_{1,0}$, $X_{2,0}$, $X_{3,0}$ $X_{4,0}$ $X_{5,0}$ .... Likewise, pixel data streams $X_1$ 414b to $X_3$ 414d $X_0$ may comprise pixels $X_{0,1}$ to $X_{5,1}$ ..., and $X_{0,3}$ to $X_{5,3}$, $X_{4,0}$ $X_{5,0}$ respectively.

The memory buffer 415 may be logically partitioned into a plurality of memory spaces 415a to 415d to hold the pixels from the respective pixel data streams $X_0$ 414a to $X_3$ 414d. The number of pixels to be processed in the scaling operation may vary by design. For illustration, if a 6-tap scaling filter may be used, each of the plurality of memory spaces 415a to 415d may hold up to six pixels at a time such as pixels $X_{0,0}$ to $X_{5,0}$ represented by a pixel column in memory space 415a. Pixel row 414e holding horizontal pixels $X_{0,0}$ to $X_{0,3}$ may be processed down the columns in sequential order. For example, when the first pixel row 414e is being scaled by scalers $S_0$ 429a to $S_3$ 429d, a subsequent pixel row of data such as $X_{6,0}$ to $X_{6,3}$ or a next chunk of pixel data starting with $X_{0,4}$ to $X_{0,7}$ may be shifted into the memory buffer 415 from the stripe buffer filing logic 427.

Each of the plurality of vertical scalers $S_0$ 429a to $S_3$ 429d may comprise a digital filter such as a finite impulse response filter (FIR filter). The FIR filter is 'finite' because its response to an impulse ultimately settles to zero. This is in contrast to infinite impulse response (IIR) filters which have internal feedback and may continue to respond indefinitely. The FIR filter has some advantageous properties since it may be inherently stable and requires no feedback so that rounding of errors may not be compounded and can have linear phase. In parallel vertical scaling, the pixels may be scaled in substantially equal phase using the same scaling factor in $S_0$ 429a to $S_3$ 429d.

Each of the pixels $Y_0$ 414a to $Y_3$ 414d at the output may represent a scaled value calculated from a plurality of vertical neighboring pixels from each of the pixel data streams $X_0$ 414a to $X_3$ 414d at the input. Scaling may be performed by FIR filters within the vertical scalers $S_0$ 429a to $S_3$ 429d based on a scaling factor and the positions of the pixels. A FIR filter may define how an input signal is related to the output signal by the following relationship:

$$Y_n = \sum_{i=0}^{4} A_i * X_{n+(i-2)}$$

where i is a variable defined by the pixel sampling size for calculation, n is the pixel position, A is a coefficient, and X is the input pixel value.

It may be desirable to generate an output $Y_n$ using a symmetrical FIR filter. A symmetrical output pixel $Y_n$ may be achieved by using symmetrical neighboring inputs for calculations. In this example, the output value $Y_n$ may depend on five input pixels stored in memory space 415a. For example an output pixel $Y_7$ may depend on input pixels $X_{5,0}$, $X_{6,0}$, $X_{7,0}$, $X_{8,0}$, $X_{9,0}$ where the vertical pixel neighbors are $X_{5,0}$, $X_{6,0}$, and $X_{8,0}$, $X_{9,0}$. It may also depend on the values of $A_0$, $A_1$, $A_2$, $A_3$ and $A_4$, also known as the coefficients of the filter. In an embodiment of the invention, the coefficients $A_0$, $A_1$, $A_2$, $A_3$ and $A_4$ may be defined by a user for scaling calculations or may be preprogrammed as a default. The coefficients $A_0$, $A_1$, $A_2$, $A_3$ and $A_4$ may or may not be the same, they may be constant and may not change with n (i.e. the pixel position). Similarly, the value of output pixel $Y_8$ may depend on input pixels $X_{6,0}$, $X_{7,0}$, $X_{8,0}$, $X_{9,0}$ and $X_{10,0}$. The coefficients $A_0$, $A_1$, $A_2$, $A_3$ and $A_4$ associated with each output pixel $Y_n$ calculation remains constant.

Figure 4B:
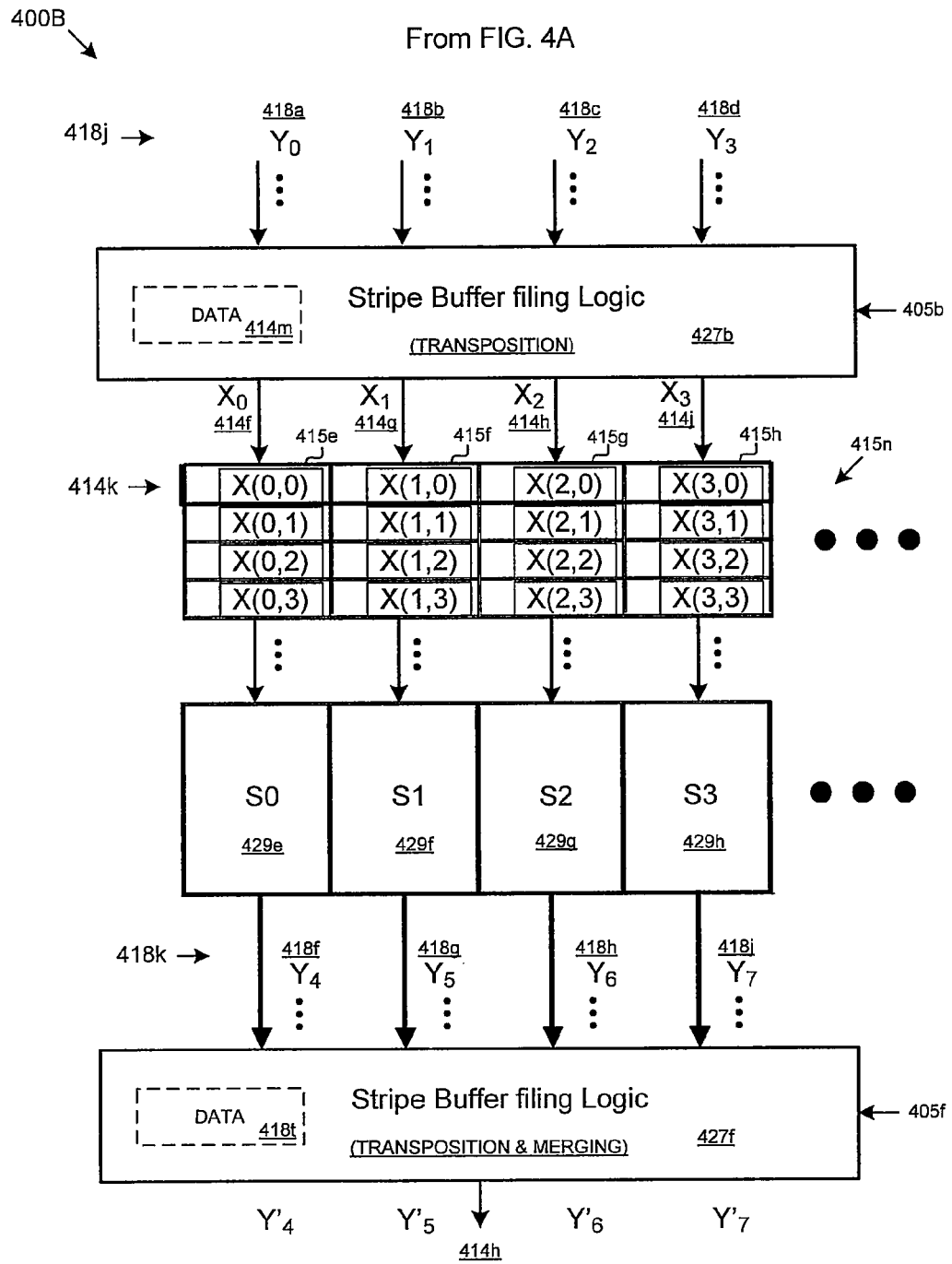
FIG. 4B is a block diagram that illustrates using vertical scalers for horizontal scaling in a multi-pixel memory to memory compositor system, in accordance with an embodiment of the invention.

FIG. 4B is a block diagram that illustrates using vertical scalers for horizontal scaling in a multi-pixel memory to memory compositor system 400B, in accordance with an embodiment of the invention. FIG. 4B is an alternate embodiment of FIG. 4A where vertical scalers $S_0$ 429e to $S_3$ 429h may be configured for horizontal scaling. FIG. 4B continues with the pixel outputs $Y_0$ 414a to $Y_3$ 414d of FIG. 4A. Referring to FIG. 4B, there is shown a second SBFL 427b, a second memory buffer 415b, a second plurality of vertical scalers $S_0$ 429e to $S_3$ 429h and a third SBFL 427f.

In an embodiment of the invention, the second SBFL 427*b* may store transposed pixel data 414*m* comprising vertically scaled output pixel data streams $Y_0$ 414*a* to $Y_3$ 414*d* from the first vertical scalers $S_0$ 429*a* to $S_3$ 429*d* in FIG. 4A. The second SBFL 427*b* under logic control 405*b* may be programmed to perform a data mapping operation to transpose vertically scaled output pixels data streams $Y_0$ 414*a* to $Y_3$ 414*d* and stripe the transposed pixel data 414*m* into a plurality of horizontal pixel data streams $X_0$ 414*f* to $X_3$ 414*j* for horizontal scaling.

For example, the vertical neighbors $X_{0,0}$, $X_{1,0}$, $X_{2,0}$, $X_{3,0}$ ... of output pixel data stream $Y_0$ 418*a* shown in FIG. 4A may be transposed to become horizontal neighbors 414*k* of parallel pixel data streams $X_0$ 414*f* to $X_3$ 414*j*. Likewise, the horizontal neighbor pixels $X_{0,0}$, $X_{0,1}$, $X_{0,2}$, $X_{0,3}$ ... of output pixel data streams $Y_0$ 418*a* to $Y_3$ 418*d* shown in FIG. 4A data may be transposed to become vertical neighbor pixels $X_{0,0}$, $X_{0,1}$, $X_{0,2}$, $X_{0,3}$ ... held in memory space $X_0$ 415*e*.

The second vertical scalers $S_0$ 429*e* to $S_3$ 429*h* may read the plurality of vertically scaled and transposed pixels from the respective memory spaces 415*e* to 415*h* for a second vertical scaling. The second vertical scaling in the second vertical scalers $S_0$ 429*e* to $S_3$ 429*h* may yield twice vertically scaled transposed output 418*k* comprising pixel data streams $Y_4$ 418*f* to $Y_7$ 418*l*.

A third SBFL 427*f* under a logic control of 405*f* may read the twice vertically scaled transposed pixels x to $Y_7$ 418*i* and may perform a second transposition into data 418*t*. The logic control 405*f* may merge the twice vertical scaled and twice transposed data 418*t* into an output 414*h* comprising data streams $Y'_4$ to $Y'_7$. The effect of twice vertical scaling and twice transposition with the merging function may yield a symmetrical scaling in both vertical and horizontal directions—equivalent to a user zooming in or zooming out an image. The invention is not limited to twice scaling or twice transposition of pixels. Accordingly, any plurality of combinations of vertical scaling or horizontal scaling, using one or more transposed pixel processing may be utilized to yield scaling to any desired aspect ratio.

Figure 4C:
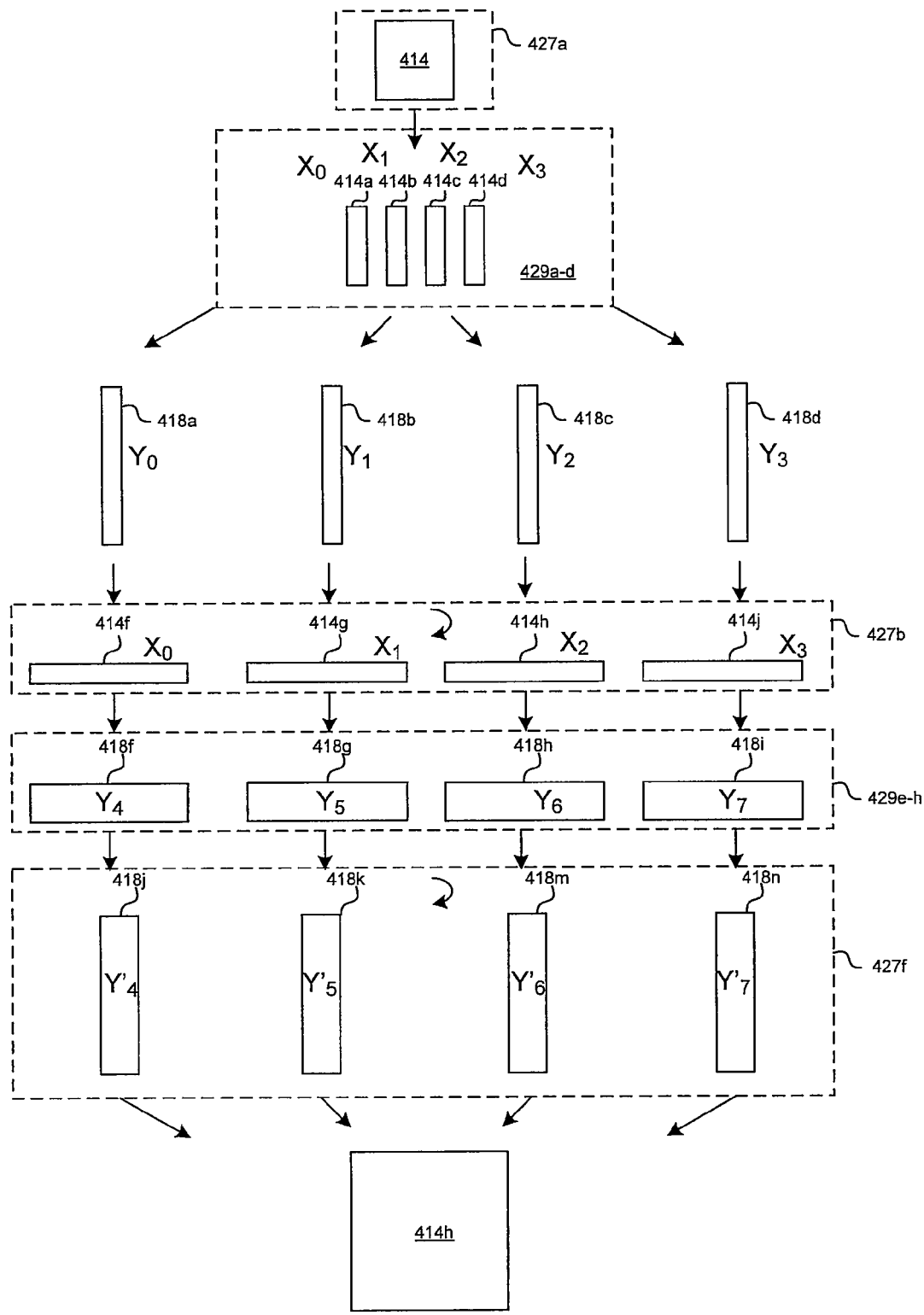
FIG. 4C is a diagram that illustrates the uses of vertical scalers for both vertical and horizontal scaling in a multi-pixel memory to memory compositor system, in accordance with an embodiment of the invention.

FIG. 4C is a diagram that illustrates the uses of vertical scalers for both vertical and horizontal scaling in a multi-pixel memory to memory compositor system, in accordance with an embodiment of the invention. The operations of FIG. 4A and FIG. 4B may be combined and illustrated by FIG. 4C using a scale factor of two in each of the vertical scalers. Reference designations from FIG. 4A and FIG. 4*b* may be referred to for description.

An image may be stored as pixel data 414. The pixel data 414 may be read by a first SBFL 427*a* and striped into four pixel data streams $X_0$ 414*a* to $X_3$ 414*d* to be read by four vertical scalers 429*a* to 429*d*. The four vertical scalers 429*a* to 429*d* may vertically scale the pixel data streams $X_0$ 414*a* to $X_3$ 414*d* with a scaling factor of two, doubling the vertical dimension as first vertically scaled output pixel data streams $Y_0$ 418*a* to $Y_3$ 418*d*. The first vertically scaled output pixel data streams $Y_0$ 418*a* to $Y_3$ 418*d* may be read and transposed by a second SBFL 427*b* and then striped as input pixel data streams $X_0$ 414*f* to $X_3$ 414*j*.

The transposed input pixel data streams $X_0$ 414*f* to $X_3$ 414*j* may be read by a second four vertical scalers 429*e* to 429*h* and be vertically scaled a second time to a twice vertically scaled transposed output pixel data streams $Y_4$ 418*f* to $Y_7$ 418*j*. The twice vertically scaled transposed output pixel data streams $Y_4$ 418*f* to $Y_7$ 4181 may be read by a third SBFL 427*f* where a second transposition may take place to generate a twice vertically scaled, twice transposed output pixel data streams $Y'_4$ 418*j* to $Y'_7$ 418*n*. The third SBFL 427*f* under a logic control 405*f* may merge the output pixel data streams $Y'_4$ 418*j* to $Y'_7$ 418*n* and combine the transposed pixel data into a single image 414*h* forming a symmetrically scaled image both vertically and horizontally.

In an embodiment of the invention, the three SBFL 427*a*, 427*b* and 427*f* may all be resided within the same memory buffer with sufficient memory allocations to store the pixel data controlled by independent control logic for independent operation.

Figure 4D:
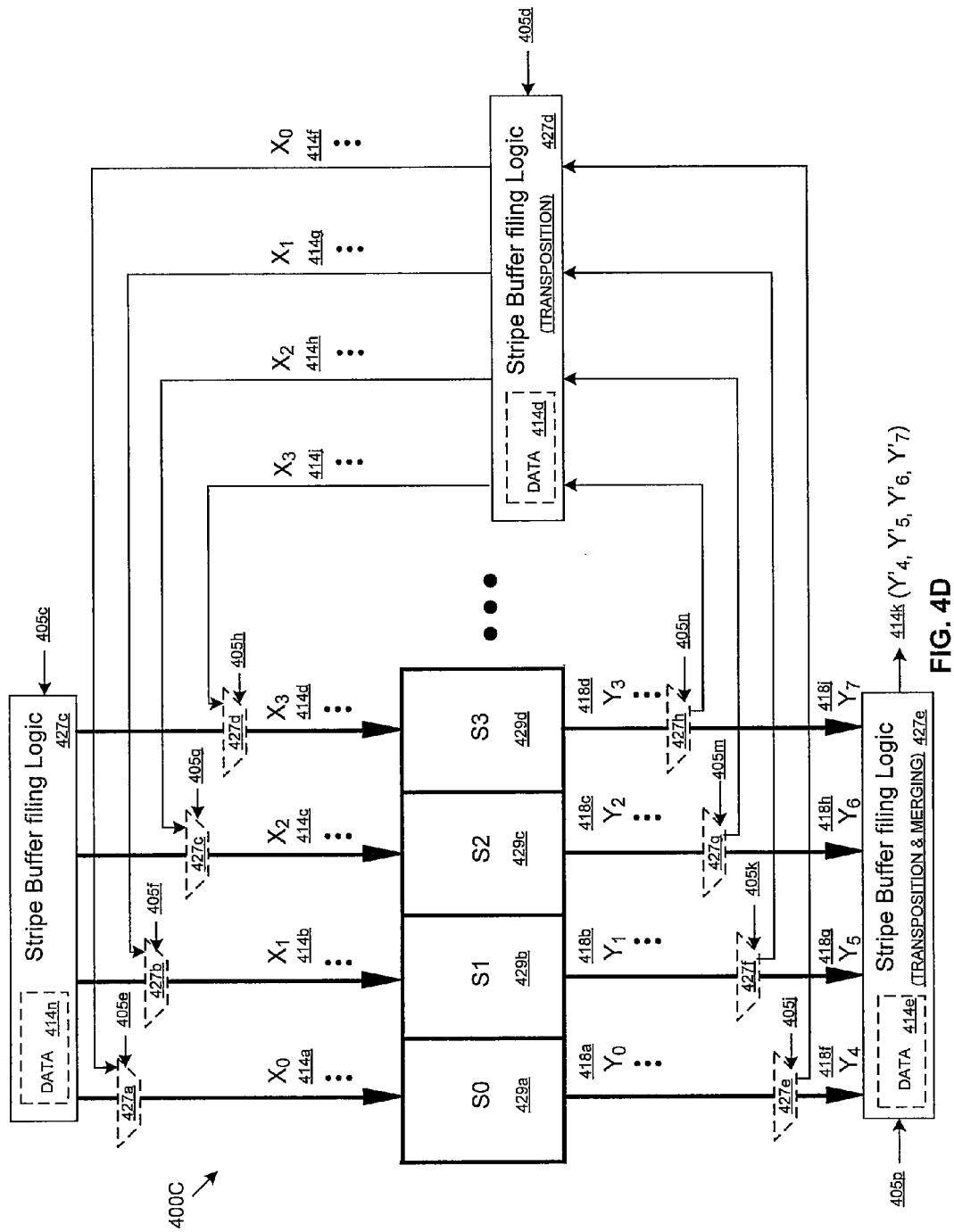
FIG. 4D is a block diagram that illustrates another embodiment using same vertical scalers for both vertical and horizontal scaling in a multi-pixel memory to memory compositor system, in accordance with an embodiment of the invention.

FIG. 4D is a block diagram that illustrates using similar vertical scalers for both vertical and horizontal scaling in a multi-pixel memory to memory compositor system 400C, in accordance with an embodiment of the invention. Referring to FIG. 4D, there is shown a first SBFL 427*c*, a plurality of input multiplexers 427*a* to 427*d*, a plurality of vertical scalers $S_0$ 429*a* to $S_3$ 429*d*, a plurality of output multiplexers 427*e* to 427*h*, a second SBFL 427*d* and a third SBFL 427*e*.

FIG. 4D may be viewed as another embodiment combining the configuration of FIG. 4A and FIG. 4B except using the same plurality of vertical scalers $S_0$ 429*a* to $S_3$ 429*d* to perform both vertical and horizontal scaling. The plurality of input multiplexers 427*a* to 427*d* may be controlled by control logics 405*e* to 405*h* to switch in either pixel data streams $X_0$ 414*a* to $X_3$ 414*d* from the first SBFL 427*c* or $X_0$ 414*f* to $X_3$ 414*j* from the second SBFL 427*d*. The plurality of output multiplexers 427*e* to 427*h* may be controlled by control logics 405*j* to 405*n* to direct first vertically scaled output pixel data streams $Y_0$ 418*a* to $Y_3$ 418*d* to the second SBFL 427*d* for pixel data transposition. An alternate route may be to output a second set of vertically scaled transposed output pixel data streams $Y_4$ 418*f* to $Y_7$ 418*j* to a third SBFL 427*e* for a second transposition.

The third SBFL 427*e* may perform a second transposition to the twice vertically scaled transposed once output pixel data streams $Y_4$ 418*f* to $Y_7$ 418*j* to generate a twice vertically scaled and twice transposed output pixel data 414*e*. A merging function under a control logic 405*p* may merge and combine the pixel data 414*e* comprising $Y'_4$ to $Y'_7$ into a symmetrically scaled image 414*k* in both vertical and horizontal directions.

The first, second and third SBFL 427*c*, 427*d* and 427*e*, the plurality of multiplexers 427*a* to 427*h* and control logics 405*c* to 405*p* may be programmed to operate in a concerted effort to facilitate vertical scaling to scale vertically and horizontally with the use of the same vertical scalers $S_0$ 429*a* to $S_3$ 429*d*. The sequence of first and second vertical scaling may be reversed to accomplish the same scaling result with a first and second transposition and a merging function.

The functions of FIG. 4A to 4D may be implemented on one or more integrated circuits in conjunction with one or more processors or controllers on a circuit board. In another embodiment of the invention, the functions FIG. 4A to 4D may reside in a host device such as a computer or a work station.

Figure 5:
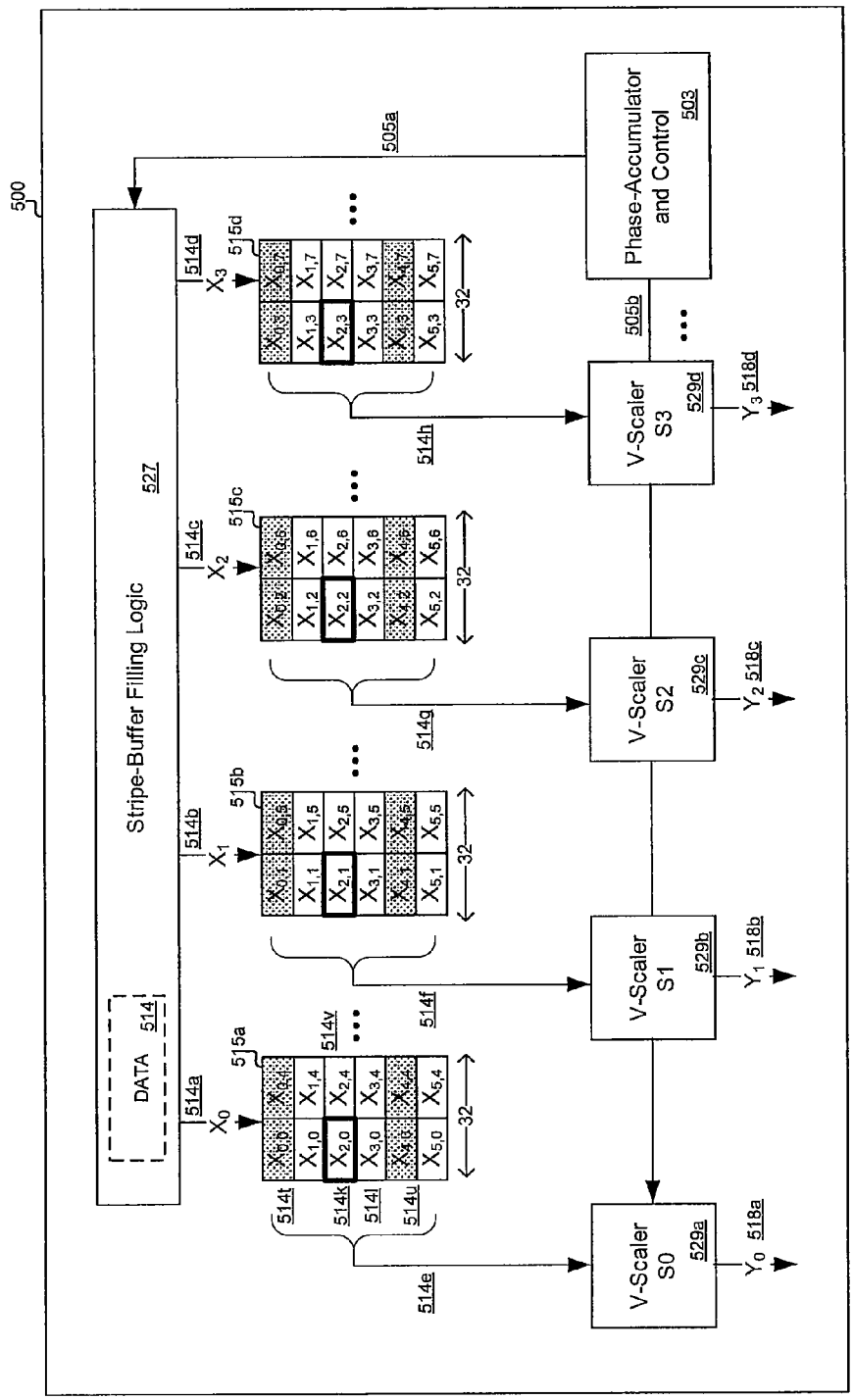
FIG. 5 is a block diagram that illustrates an exemplary vertical scale down or scale up processes in a multi-pixel memory to memory compositor system, in accordance with an embodiment of the invention.
Figure 5:
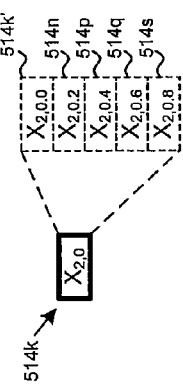

FIG. 5 illustrates an exemplary vertical scale down or scale up processes in a multi-pixel memory to memory compositor system, in accordance with an embodiment of the invention. Referring to FIG. 5, there is shown a multi-pixel memory to memory compositor system 500 comprising a stripe buffer filing logic (SBFL) 527, a plurality of parallel input pixel data streams $X_0$ 514*a* to $X_3$ 514*d* stored in a plurality of memory spaces 515*a* to 515*d*, a plurality of vertical scalers $S_0$ 529*a* to $S_3$ 529*d*, a phase accumulator control 503 and the plurality of vertical scalers $S_0$ 529*a* to $S_3$ 529*d* respectively, and a plurality of respective parallel output pixel data streams $Y_0$ 518*a* to $Y_3$ 518*d*. The use of four parallel vertical scalers proportionately increases the throughput of pixel scaling per clock cycle by four times in this exemplary illustration. Notwithstanding, the invention is not limited to scaling by four times. Higher or lower throughputs may be controlled by using more or less vertical scalers in parallel arrangement.

In an embodiment of the invention, it may be shown that the SBFL 527 may be 128 pixels wide sending four parallel pixel data streams $X_0$ 514a to $X_3$ 514d with 32 pixels width each to stripe across four memory buffers 515a to 515d. For example, the four memory spaces 515a to 515d may each hold up to six vertically neighboring pixels at a time shown as $X_{0,0}$ 514t to $X_{5,0}$ 514v, $X_{0,1}$ to $X_{5,1}$, $X_{0,2}$ to $X_{5,2}$, and $X_{0,3}$ to $X_{5,3}$ respectively. In another embodiment of the invention, the memory spaces 515a to 515d may each hold more or less than six pixels at a time. In another embodiment of the invention, each of the memory spaces 515a to 515d may hold a subsequent stripe of pixels $X_{0,4}$ to $X_{5,4}$, $X_{0,5}$ to $X_{5,5}$, $X_{0,6}$ to $X_{5,6}$, and $X_{0,7}$ to $X_{5,7}$ from the SBFL 527.

FIG. 5 illustrates two exemplary vertical scaling processes, namely a divide by four scale down process and a multiply by five scale up process. A description of a single vertical scaling process by the vertical scaler $S_0$ 529a may provide sufficient illustration to the rest of parallel vertical scalers $S_1$ 529b to $S_3$ 529d.

In a scale down by four process (scaling factor of ¼), the vertical scaler $S_0$ 529a may comprise, for example, a five tap FIR filter (process five data points to produce an output). The exemplary five tap FIR filter may be programmed to initially read up to five out of six pixels $X_{0,0}$ to $X_{5,0}$ (one pixel per clock cycle at a time) from the memory space 515a to generate an initial output pixel $Y_0$ 518a. The initial output pixel $Y_0$ may be initiated at the starting pixel $X_{0,0}$ in the data stream 514e. A subsequent output pixel $Y_0$ 518a may be generated co-located with input pixel-position $X_{4,0}$ 514u.

Likewise, the output pixel $Y_0$ 518a for a next pixel data stream $X_{0,4}$ to $X_{5,4}$ in scaler $S_0$ 529a may be sampled and generated at pixels $X_{0,4}$ and $X_{4,4}$. The divide by four scaling shows that the output $Y_0$ 518a is generated with a sampling rate of every four pixels in the input pixel data stream $X_0$ 514a. The shaded pixels in memory spaces 515b to 515d represent the pixel clock cycle locations where respective output pixels $Y_1$ 518b to pixel $Y_3$ 518d may be generated. The initial pixel sampling point may take place at any pixels within $X_{0,0}$ 514t to $X_{5,0}$ 514v. In another embodiment of the invention, the FIR filter calculations may be programmed to use any suitable pixel sampling sizes more or less than five pixels. Accordingly, the pixel per clock cycle throughput may be multiplied by four times or higher by increasing the number of parallel scalers used.

In a scale up by five process (scaling factor of 5), a five tap FIR filter in the vertical scaler $S_0$ 529a may be programmed to read five out of six pixels $X_{0,0}$ to $X_{5,0}$ from the memory buffer 515a to generate an initial output pixel $Y_0$ 518a. In scaling up by five, four additional pixels may be inserted in each of the pixels $X_{0,0}$ to $X_{5,0}$. In an exemplary embodiment of the invention, the pixel $X_{2,0}$ 514k may be scaled up by five to yield pixels $X_{2,0,0}$ 514k' to pixel $X_{2,0,8}$ 514s with equal pixel spacing (step size) by an interpolation process. The step size is the reciprocal of the scaling factor. In this example, for a scaling factor of five, the step size is 0.2 for interpolation calculation.

The process of FIR filter calculation for scaling and inserted pixel generation may incur additional delays in the scaling process. The initial time taken to generate a scaled up output pixel $Y_0$ 518a may comprise the sum of clock cycles for reading the pixel data stream $X_{0,0}$ 514t to $X_{5,0}$, FIR filter calculations for scaling, insertion and in sending output pixels $Y_0$ 518a. The higher the scaling factor, the longer it may take to generate the output pixels $Y_0$ 518a.

Likewise, the FIR filter calculations for scaling up may use any suitable pixel sampling sizes more than or less than five pixels. Any combinations of pixel sampling sizes or scaling factors may be used without departing from the spirit of the invention. The scaling up or scaling down of pixels may be processed at a rate of one pixel per clock cycle in the each of the scalers $S_0$ 529a to $S_3$ 529d. Accordingly the throughput may be multiplied by four times or higher by increasing the number of parallel scalers available.

The input and output scaler paths may use the same phase accumulator and control logic 505a and 505b sent from the phase accumulator and control (PAC) 503. The phase accumulator and control 503 may comprise a controller or processor with suitable circuits, logic or codes to manage a plurality of functions in the vertical scaling processes. In this example, the PAC 503 may issue control logics 505a and 505b to control the SBFL 527 and the plurality of vertical scalers $S_0$ 529a to $S_3$ 529d. The PAC 503 may manage the stripe buffer filing logic for partitioning and sending of parallel pixel data streams $X_0$ 514a to $X_3$ 514d to the memory spaces 515a to 515d. In another instance, the phase accumulator and control 503 may control the rate of data flow into the memory spaces 515a to 515d. In another instance, the PAC 503 may align the pixels in all data paths 514e to 514h to a substantially equal phase value prior to scaling. In another instance, the PAC 503 may communicate information such as scaling parameters for FIR filter calculations, pixel sample sizes i, pixel number n, or other controls such as enable control to the plurality of scalers $S_0$ 529a to $S_3$ 529d. In another instance, the PAC 503 may control the logic of the multiplexers 427a to 427h and the plurality of SBFL 427c to 427e for data transposition shown in FIG. 4D.

In the above examples, a four pixel per clock cycle scaling of multi-pixel data streams $X_0$ 514a to $X_3$ 514d have been illustrated. By increasing the number of parallel vertical scalers, higher throughput of pixels may be scaled proportionately, thus reducing the use of multiple instances and replacing single-pixel scaling to achieve higher throughput.

Figure 6:
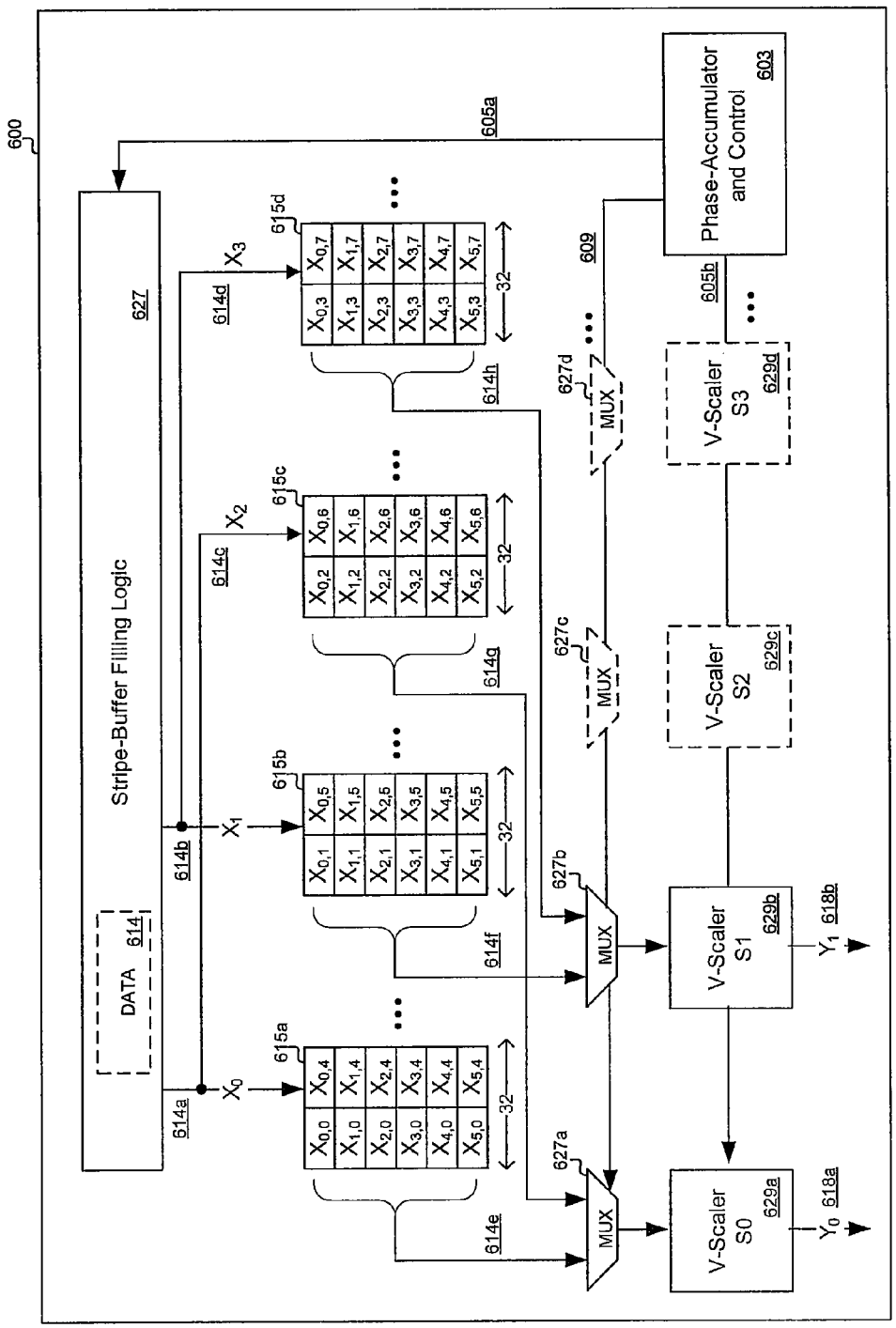
FIG. 6 is a block diagram that illustrates an exemplary vertical scaler that utilizes fewer pixels per clock cycle in a multi-pixel memory to memory compositor system, in accordance with an embodiment of the invention.

FIG. 6 is a block diagram that illustrates an exemplary vertical scaler that utilizes fewer pixels per clock cycle in a multi-pixel memory to memory compositor system, in accordance with an embodiment of the invention. Referring to FIG. 6, there is shown a multi-pixel memory to memory compositor system 600 comprising a stripe buffer filing logic (SBFL) 627 controlled by logic 605a, a plurality of parallel input pixel data streams $X_0$ 614a to $X_3$ 614d stored in a plurality of memory space 615a to 615d, a plurality of multiplexers 627a to 627d, a plurality of vertical scalers S0 629a to S3 629d, a phase accumulator and control (PAC) block 603 issuing control logic 605a, 605b and 609 and a plurality of respective parallel output pixel data streams $Y_0$ 618a to $Y_3$ 618d from vertical scalers S0 629a and S1 629b.

Similar to FIG. 5, the multi-pixel memory to memory compositor system 600 may be modified to process a plurality of input pixel data streams $X_0$ 614a to $X_3$ 614d using two vertical scalers S0 629a and S1 629b controlled by control logic 605b. The higher capacity architecture may be selectively switched off to a lower capacity in order to conserve power or hardware resources such as selectively switching off vertical scalers S2 629c and S3 629d for other needed processes.

The phase accumulator control (PAC) 603 may send control logic 605a to the SBFL 627 such that input pixel data streams $X_0$ 614a and $X_1$ 614b may be striped into memory spaces 615a and 615b through data paths 614a and 614b. Input pixel data streams $X_2$ 614c and $X_3$ 614d may next be striped into memory spaces 615c and 615d through data paths 614a and 614b. The multiplexers 627a and 627b controlled by control logic 609 may be used to switch in pixel data streams to be read by vertical scalers $S_0$ 629a and $S_1$ 629b from data paths 614e to 614h for vertical scaling.

In this example, control logic 609 from the PAC 603 may control the multiplexers 627a and 627b to switch in data paths 614e and 614f to read pixels $X_{0,0}$ to $X_{5,0}$ and $X_{0,1}$ to $X_{5,1}$ from memory spaces 615a and 615b for scaling by vertical scalers $S_0$ 629a and $S_1$ 629b. Upon completion of scaling pixels $X_{0,0}$ to $X_{5,0}$ and $X_{0,1}$ to $X_{5,1}$, the control logic 609 may control the multiplexers 627a and 627b to switch in data paths 614g and 614h to read pixels $X_{0,2}$ to $X_{5,2}$ and $X_{0,3}$ to $X_{5,3}$ from memory spaces 615c and 615d for scaling by vertical scalers $S_0$ 629a and $S_1$ 629b. This operation may repeat using two vertical scalers $S_0$ 629a and $S_1$ 629b to process a plurality of input pixels data streams at an effective processing rate of two pixels per clock cycle. Similarly, a one pixel per clock cycle processing rate may utilize the multiplexer 627a to switch in pixels from data paths 614e to 614h for scaling one data stream at a time in sequential order or any desired order.

In another embodiment of the invention, the remaining unused vertical scalers 629c and 629d may be configured as a second vertical scalers to scale transposed output pixel data streams $Y_0$ 414a to $Y_3$ 414d to accomplish horizontal scaling. Such configuration of partitioning or sharing vertical scaler resources to perform vertical and horizontal scaling may be implemented with the use of a second SBFL and a plurality of multiplexers as shown in FIGS. 4B and 4C.

Figure 7A:
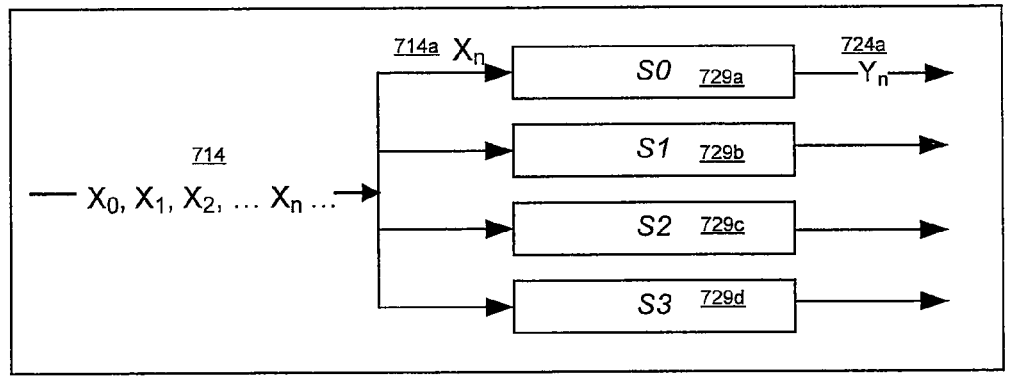
FIG. 7A is a block diagram that illustrates exemplary horizontal scaling using a single-pixel per clock cycle in a multi-pixel memory to memory compositor system, in accordance with an embodiment of the invention.

FIG. 7A is a block diagram that illustrates exemplary horizontal scaling using a single-pixel per clock cycle in a multi-pixel memory to memory compositor system, in accordance with an embodiment of the invention. Referring to FIG. 7A, there is shown an input pixel data stream 714 $X_0$, $X_1$, $X_2$, $X_n$, . . . , a plurality of horizontal scalers S0 729a to S3 729d and an output pixel data stream $Y_n$ 724a. The input pixel data stream 714 may comprise sequential pixels $X_0$, $X_1$, $X_2$, $X_n$, . . . where each pixel has at least one horizontal neighbor.

In an embodiment of the invention, horizontal scaling may be done by a single-pixel horizontal scaler $S_0$ 729a in a multi-pixel memory to memory compositor system in FIG. 7A. Each of the horizontal scalers $S_0$ 729a to $S_3$ 729d may comprise a FIR filter calculating an output pixel $Y_n$ 724a using horizontal neighboring pixels $X_0$, $X_1$, $X_2$, $X_n$, . . . for calculations. For example, if the scaler $S_0$ 729a uses a five tap FIR filter, the output pixel data stream $Y_n$ 724a may be calculated using input horizontal neighboring pixels $X_{n-2}$, $X_{n-1}$, $X_n$, $X_{n+1}$ and $X_{n+2}$.

It may take the scaler $S_0$ 729a at least a clock cycle to read in a new pixel from the input data stream 714. For example, if the scaling factor is one, it may take a clock cycle to output $Y_n$ to $Y_{n+1}$ where $Y_n$ and $Y_{n+1}$ may be calculated from horizontal neighboring pixels $X_{n-2}$, $X_{n-1}$, $X_n$, $X_{n+1}$, $X_{n+2}$ and $X_{n-1}$, $X_n$, $X_{n+1}$, $X_{n+2}$, $X_{n+3}$ respectively. In another embodiment of the invention, if the scaling factor is two in the scaler $S_0$ 729a, the output pixel data stream $Y_n$ 724a may comprise two output pixels $Y_{n,0}$ and $Y_{n,1}$ calculated from horizontal neighboring pixels $X_{n-2}$, $X_{n-1}$, $X_n$, $X_{n+1}$ and $X_{n+2}$. In generating two output pixels $Y_{n,0}$ and $Y_{n,1}$, the single-pixel horizontal scaler $S_0$ 729a may require at least two clock cycles to complete scaling of two for every input pixel $X_n$ read into the scaler $S_0$ 729a. The scaler $S_0$ 729a processing efficiency may be reduced by a factor of two accordingly. This example may be further illustrated in scenario 800a in FIG. 8.

Using a single-pixel horizontal scaler to perform scale up or scale down operation is analogous to using a vertical scaler $S_0$ 429a to process a plurality of transposed input data streams $X_0$ 414a to $X_3$ 414d where the vertical neighbor pixels (presumably stored in a memory space 415a) become an equivalent of horizontal neighbor pixels across a row 414e as shown in FIG. 4A.

Figure 7B:
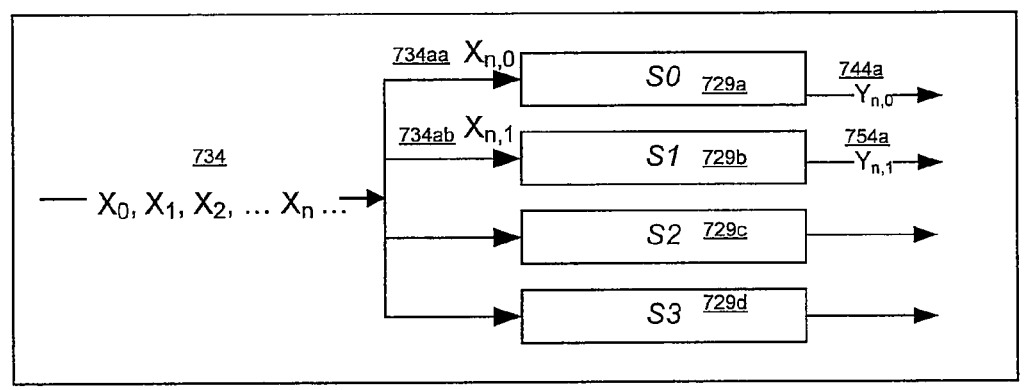
FIG. 7B is a block diagram that illustrates exemplary horizontal scaling using two pixels per clock cycle in a multi-pixel memory to memory compositor system, in accordance with an embodiment of the invention.

FIG. 7B is a block diagram that illustrates exemplary horizontal scaling using two pixels per clock cycle in a multi-pixel memory to memory compositor system, in accordance with an embodiment of the invention. Referring to FIG. 7B, there is shown an input multi-pixel data stream $X_0$ $X_1$, $X_2$, $X_n$, . . . 734, a plurality of horizontal scalers $S_0$ 729a to $S_3$ 729d and two output pixels $Y_{n,0}$ 744a to $Y_{n,1}$ 754a.

With an understanding that the efficiency of vertical scaling may be increased by parallelizing vertical scalers, likewise horizontal scaling may be increased by parallelizing horizontal scalers. However, each of the horizontal scalers $S_0$ 729a to $S_3$ 729d may process the same sequence of pixels (i.e. same row of pixels 414e shown in FIG. 4A) instead of processing vertical sequences of pixels (i.e. columns of pixels in memory spaces 415a to 415d shown in FIG. 4A).

For example, FIG. 7B illustrates an alternate horizontal scale by two process adapted to a two pixel per clock cycle operation using two scalers $S_0$ 729 and $S_1$ 729b each processing a same input pixel $X_n$ in a clock cycle (from a sequence of horizontal neighboring pixels $X_{n-2}$, $X_{n-1}$, $X_n$, $X_{n+1}$, $X_{n+2}$). Horizontal scaling of the sequential pixels $X_{n-2}$, $X_{n-1}$, $X_n$, $X_{n+1}$, $X_{n+2}$ may have a complex problem because the adjacent horizontal pixels scaling operation in each of the horizontal scaler $S_0$ 729 or $S_1$ 729b may not be separable. The same pixel $X_n$ may be replicated and read as input pixels $X_{n,0}$ 734aa to $X_{n,1}$ 734ab, each differs by a step-size and an initial phase parameters, by horizontal scalers $S_0$ 729a and $S_1$ 729b respectively.

Two output pixels $Y_{n,0}$ 744a to $Y_{n,1}$ 754a may be calculated from respective input pixels $X_{n,0}$ 734aa to $X_{n,1}$ 734ab from horizontal neighboring pixels $X_{n-2}$, $X_{n-1}$, $X_n$, $X_{n+1}$, $X_{n+2}$ in the five tap FIR filters in horizontal scalers $S_0$ 729a and $S_1$ 729b respectively. The two output pixels $Y_{n,0}$ 744a to $Y_{n,1}$ 754a may represent doubling the scaling factor by parallel horizontal scalers $S_0$ 729a and $S_1$ 729b where two output pixels $Y_{n,0}$ 744a to $Y_{n,1}$ 754a are generated from an input pixel $X_n$ without the penalty of consuming two clock cycles in each of the horizontal scalers $S_0$ 729a and $S_1$ 729b. Therefore doubling the parallel horizontal scalers may double the pixel processing efficiency by two correspondingly. In an alternate embodiment of the invention, each of the two parallel horizontal scalers $S_0$ 729a and $S_1$ 729b may be programmed with a scaling factor of two to produce an effective scaling factor of four.

Figure 7C:
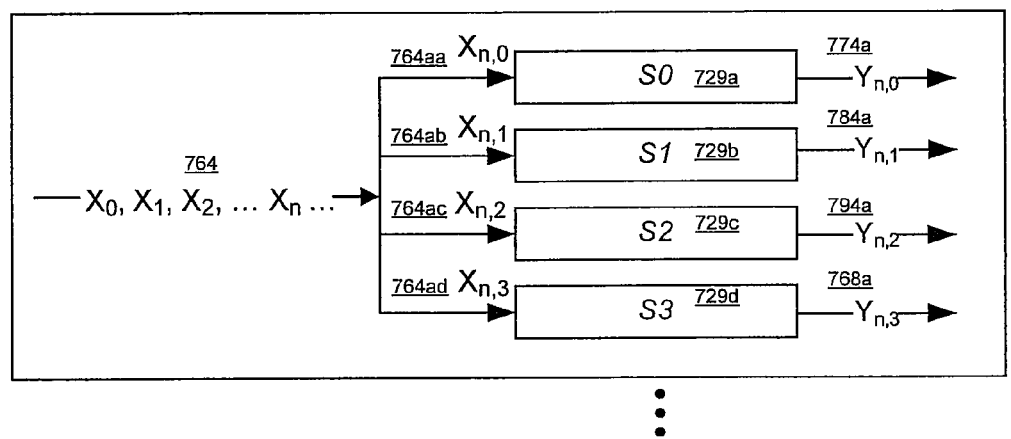
FIG. 7C is a block diagram that illustrates exemplary horizontal scaling using four pixels per clock cycle in a multi-pixel memory to memory compositor system, in accordance with an embodiment of the invention.

FIG. 7C is a block diagram that illustrates exemplary horizontal scaling using four pixels per clock cycle in a multi-pixel memory to memory compositor system, in accordance with an embodiment of the invention. Referring to FIG. 7C, there is shown an input multi-pixel data stream $X_0$, $X_1$, $X_2$, $X_n$, . . . 764, a plurality of horizontal scalers 729a to 729d and output pixels $Y_{n,0}$ 774a, $Y_{n,1}$ 784a, $Y_{n,2}$ 794a and $Y_{n,3}$ 768a.

FIG. 7C is an extension of FIG. 7B, which illustrates exemplary quadrupling of the horizontal scalers 729a to 729d to achieve an effective scaling factor of four. In this regard, four output pixels $Y_{n,0}$ 774a to $Y_{n,1}$ 768a may be generated from an input pixel $X_n$ without the penalty of consuming four clock cycles if performed by a single horizontal scaler. Accordingly the same pixel $X_n$ may be replicated and read as input pixels $X_{n,0}$ 764aa to $X_{n,1}$ 764ad horizontal scalers S0 729a to S3 729d respectively. Each of the read input pixels $X_{n,0}$ 764aa to $X_{n,1}$ 764ad may differ by a step-size and an initial phase parameters.

Contrary to parallel vertical scaling in FIG. 5, where each of the vertical scalers 529a to 529d may be controlled by the same control logic 505b from the phase accumulator control 503, each of the plurality of horizontal scalers 729a to 729d may be independently phase controlled by a plurality of control logic. Each of the output pixels $X_{n,0}$ 764aa to $X_{n,1}$ 764ad scaled by the plurality of horizontal scalers 729a to 729d may have a different initial phase angle. A high scaling factor (scale up or scale down) may accumulate sufficient phase delays or pixel separations due to step sizes. The phase angle and step size problems may be illustrated by scenario 800C in FIG. 8

Figure 8:
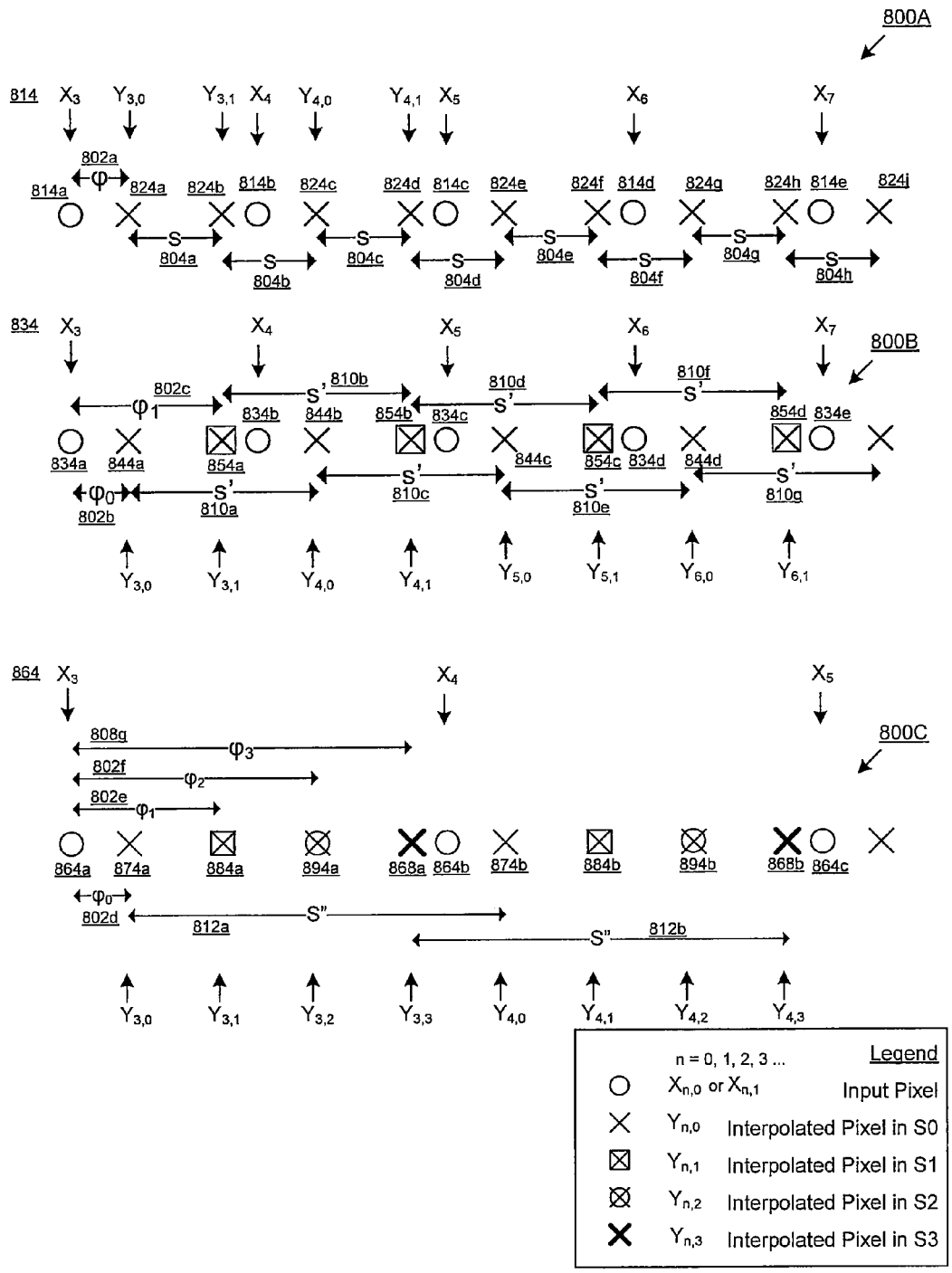
FIG. 8 is a block diagram that illustrates exemplary phase and step size relationship of output pixels from a plurality of parallel horizontal scalers, in accordance with an embodiment of the invention.

FIG. 8 is a block diagram that illustrates exemplary phase and step size relationship of output pixels from a plurality of parallel horizontal scalers, in accordance with an embodiment of the invention. Referring to FIG. 8, there is shown a scenario 800A of scaling up by two operating at a single-pixel per clock cycle using a single horizontal scaler, a scenario 800B of scaling up by two operating at an effective two pixels per clock cycle by using two parallel horizontal scalers and a scenario 800C of scaling up by four operating at an effective four pixels per clock cycle by using four parallel horizontal scalers.

Scenario 800A illustrates the phase angle and step size relationship of output pixel $Y_n$ 724a from scaler $S_0$ 729a shown in FIG. 7A. An Input pixel (source pixel) $X_n$ may be represented as a circle. For example $X_n$ with values of n=3, 4, 5, 6, and 7 (n being the pixel position) may be depicted as $X_3$ 814a to $X_7$ 814e. Output pixels $Y_{3,0}$ 824a and $Y_{3,1}$ 824b may be represented by a cross being calculated from horizontal neighboring pixels $X_1$, $X_2$ (do not exist or have no value in this example), $X_3$ 814a, $X_4$ 814b and $X_5$ 814c using a five tap FIR filter in scaler $S_0$. Since neighboring pixels $X_1$, $X_2$ do not have values, in an instance, pixel $X_3$ 814a may be repeated three times to replace $X_1$, $X_2$ in the calculation. Similarly, output pixels $Y_{6,0}$ 824g and $Y_{6,1}$ 824h may be calculated from horizontal neighboring pixels $X_4$ 814b, $X_5$ 814c, $X_6$ 814d, $X_7$ 814e and $X_8$ (not exist) in scaler $S_0$ and $X_7$ 814e may be repeated twice to replace $X_8$ for calculations.

The initial output pixel $Y_{3,0}$ 824a may carry a phase angle φ representing an initial phase delay, the second output pixel $Y_{3,1}$ 824b may be separated by a step size of s 804a, where s 804a is the reciprocal of the scaling factor per clock cycle. In this example, if the scaling factor is two (Sx=2), the step size s 804a (s=½). For a subsequent input pixel $X_4$ 814b, the outputs $Y_{4,0}$ 824c and $Y_{3,0}$ 824a may be separated by the a value of step size 2s (sum of 804a and 804b).

Although the step size s 804a between output pixels $Y_{3,0}$ 824a and $Y_{3,1}$ 824b may be half of pixel sampling distance, generating either output $Y_{3,0}$ 824a or $Y_{3,1}$ 824b may each consume a full clock cycle per pixel. In this example, the scaler $S_0$ may consume one input pixel $X_3$ 814a at a peak rate of one pixel per clock cycle, assuming no initial phase angle φ 802a as delay, the scaler $S_0$ would have to wait for at least two clock cycles to clear the outputs pixels $Y_{3,0}$ 824a and $Y_{3,1}$ 824b. Therefore, the effective time required to process one input pixel $X_n$ per clock cycle having a scaling factor of two would require at least two clock cycles.

Scenario 800B illustrates the phase angle and step size relationship of output pixels $Y_{n,0}$ 744a and $Y_{n,1}$ 754a from scalers $S_0$ 729a and 729b respectively shown in FIG. 7B. For example $X_n$ with values n=3, 4, 5, 6, and 7 may be depicted as $X_3$ 834a to $X_7$ 834e. Output pixel $Y_{3,0}$ 844a may be represented by a cross may be calculated from horizontal neighboring pixels $X_1$, $X_2$, (not shown), $X_{3,0}$ 834a, $X_{4,0}$ 834b and $X_{5,0}$ 834c using a five tap FIR filter in scaler $S_0$. Similarly, output pixel $Y_{3,1}$ 854a represented by a crossed square may be calculated from horizontal neighboring pixels $X_1$, $X_2$ (not shown), $X_{3,0}$ 834a, $X_{4,0}$ 834b and $X_{5,0}$ 834c in scaler $S_1$.

Similarly, output pixels $Y_{6,0}$ 844d and $Y_{6,1}$ 854d may be calculated from horizontal neighboring pixels $X_{4,0}$ 834b, $X_{5,0}$ 834c, $X_{6,0}$ 834d, $X_{7,0}$ 834e and $X_{8,0}$ (not shown) in scaler $S_0$ and $X_{4,0}$ 834b, $X_{5,0}$ 834c, $X_{6,0}$ 834d, $X_{7,0}$ 834e and $X_{8,0}$ (not shown) in scaler S1.

The phase angle and step size values derived by hardware for each of these parallel horizontal scalers may be defined by the following relationships:

s=1/(Sx), where Sx being the scaling factor, s being the step size per scaler, s'=s*N, where s' being the new step size per N scalers, $φ_n$=φ+(N−1)*s, where φ 802a is the initial phase angle, and $φ_n$ is the phase angle for n-th scaler in the group.

In the above relationships, N defines the numerical quantity of scalers used, which is related to how many pixels may be processed per clock cycle. In the examples used, N may take values of 1, 2 or 4 in scenarios 800A, 800B or 800C. Notwithstanding, the invention may not be so limited and N may take on other values.

n∈{0, 1, . . . N−1} n being the identity of the scaler, for example, n would be 0 for scaler S0, 1 for scaler S1 and so on.

Knowing the phase value and step size (reciprocal of scaling factor—a user input), the multi-pixel memory to memory compositor system new step size and phase angle values for the output pixels may be calculated.

The concept of adjusting the phase and step-size to achieve higher throughput may be illustrated in scenario 800B with two parallel scalers. For N=2, the phase and step parameters are defined as:

s'=2s, (step size S' 810a—separation between subsequent pixels in the same scaler output)

$φ_0$=φ, (phase angle $φ_0$ 802b for pixel $Y_{3,0}$ 844a)

$φ_1$=φ+s, (phase angle $φ_1$ 802c for pixel $Y_{3,1}$ 854a)

The initial output pixel $Y_{3,0}$ 844a by scaler S0 may carry a phase angle $φ_0$ 802b representing an initial phase delay, the second output pixel $Y_{3,1}$ 854b by scaler S1 may carry a phase angle $φ_1$ 802b. The output pixels $Y_{3,0}$ 844a and $Y_{3,1}$ 854a may be processed within a substantially similar clock cycle where scalers S0 and S1 may be independently phase controlled due to the differences in phase angles $φ_0$ 802b and $φ_1$ 802b.

In this scenario, an effective two pixels per clock cycle may be achieved where two output pixels $Y_{3,0}$ 844a and $Y_{3,1}$ 854a are generated by two horizontal scalers S0 and S1 each with a scaling factor or one for the input pixels $X_3$ $X_3$ $X_3$ $X_4$ $X_5$ of input pixel data stream 834. Likewise, an effective scaling factor of two may be produced from the two parallel horizontal scalers S0 and S1.

The outputs $Y_{4,0}$ 844b and $Y_{4,1}$ 854b may be each separated by the same value of step size s' 810a and 810b from outputs $Y_{3,0}$ 844a and $Y_{3,1}$ 854a. The outputs for example, $Y_{3,0}$ 844a and $Y_{3,1}$ 854a of the scalers S0 and S1 may not be produced at the same time (shown with differing phase angles $φ_0$ 802b and $φ_1$ 802c) and buffering may be required at the output of each of the individual scalers S0 to S1 for performing a proper interleaving of outputs.

Scenario 800C further illustrates the phase angles and step size relationship of output pixels $Y_{n,0}$ 774a, $Y_{n,1}$ 784a, $Y_{n,2}$ 794a and $Y_{n,2}$ 768a from scalers S0 729a to 729d respectively shown in FIG. 7C. For example $X_n$ with values n=3 and 4 may be depicted as $X_3$ 864a and $X_4$ 864b. The output pixel $Y_{3,0}$ 874a may be represented by a cross may be calculated from horizontal neighboring pixels $X_{1,0}$, $X_{2,0}$ (not exist), $X_{3,0}$ 864a, $X_{4,0}$ 864b and $X_{5,0}$ 864c using a five tap FIR filter in scaler S0. Similarly, the output pixel $Y_{3,1}$ 884a represented by a crossed square may be calculated from horizontal neighboring pixels $X_{1,0}$, $X_{2,0}$ (not exist), $X_{3,0}$ 864a, $X_{4,0}$ 864b and $X_{5,0}$ 864c in scaler S1.

Similarly, output pixel $Y_{3,2}$ 894a represented by a crossed circle may be calculated from horizontal neighboring pixels $X_{1,0}$, $X_{2,0}$ (do not exist or have no value in this example), $X_{3,0}$ 864a, $X_{4,0}$ 864b and $X_{5,0}$ 864c in scaler S2. Similarly, output pixel $Y_{3,3}$ 868a represented by a crossed bolded may be calculated from horizontal neighboring pixels $X_{1,0}$, $X_{2,0}$ (do not exist or have no value in this example), $X_{3,0}$ 864a, $X_{4,0}$ 864b and $X_{5,0}$ 864c in scaler S3. Similarly, output pixels $Y_{4,0}$ 874b to $Y_{4,3}$ 868b may be calculated from similar calculations in scalers S0 to S3.

Output pixels $Y_{3,1}$ 884a to $Y_{3,3}$ 868a may be processed within a substantially same clock cycle where scalers S0 to S3 may be independently controlled due to the difference in phase angles $\phi_0$ 802d, $\phi_1$ 802e, $\phi_2$ 802f and $\phi_3$ 802g.

In this scenario, an effective four pixels per clock cycle may be achieved where four output pixels $Y_{3,0}$ 874a to $Y_{3,3}$ 868a may be generated by four horizontal scalers S0 to S3 each with a scaling factor or one for the input pixel $X_3$ of input pixel data stream 864. Likewise, an effective scaling factor of four may be produced from the four parallel horizontal scalers S0 to S4.

For a subsequent input pixel $X_4$ 864b, the outputs $Y_{4,0}$ 874b and $Y_{4,3}$ 868b may be each separated by the same value of step size s" 812a and 812b from outputs $Y_{3,0}$ 874a and $Y_{3,3}$ 868a.

Figure 9A:
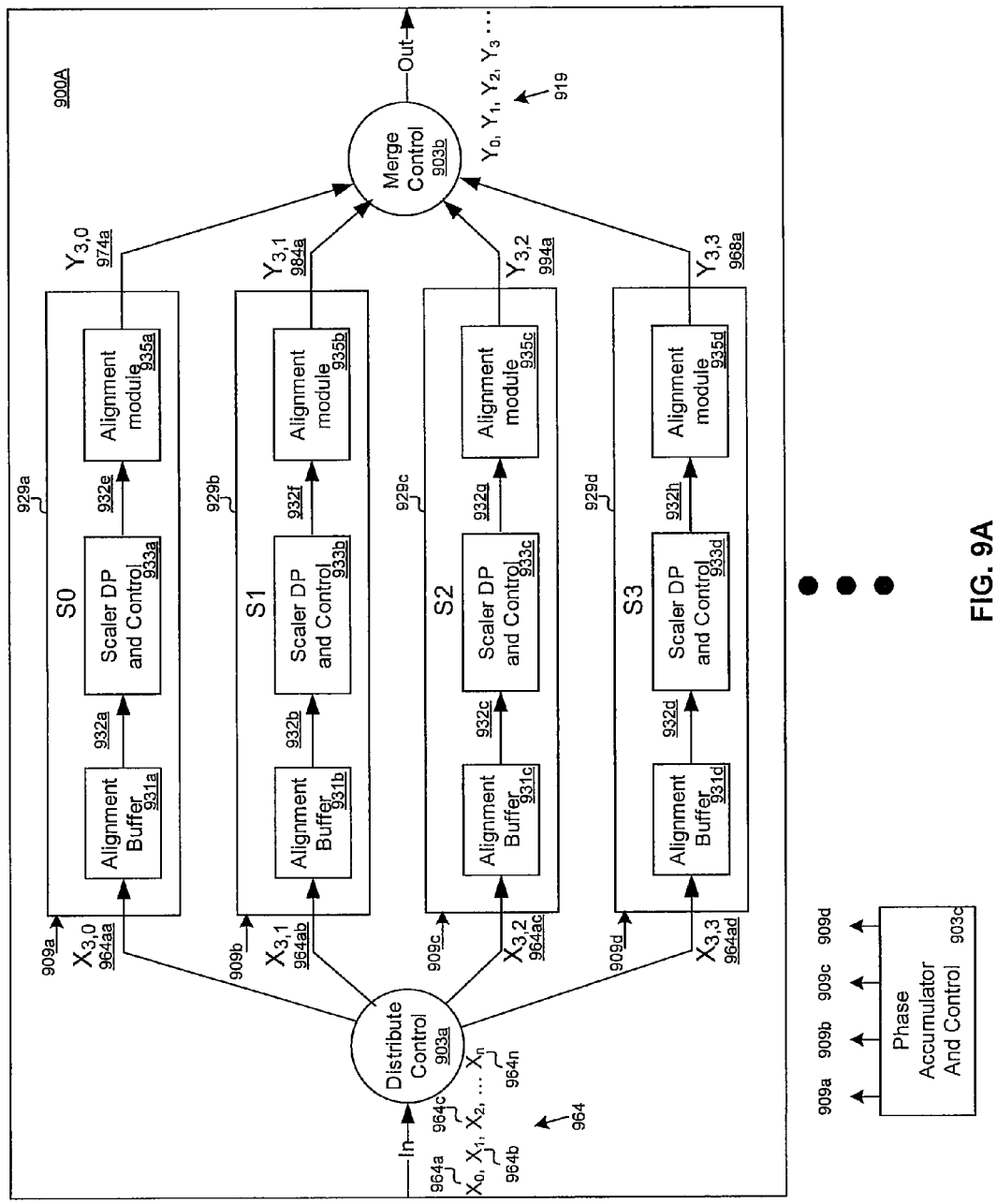
FIG. 9A is a block diagram that illustrates exemplary multi-pixel per clock cycle horizontal scaler for a multi-pixel memory to memory compositor system, in accordance with an embodiment of the invention.

FIG. 9A is a block diagram that illustrates exemplary multi-pixel per clock cycle horizontal scaler for a multi-pixel memory to memory compositor system 900A, in accordance with an embodiment of the invention. Referring to FIG. 9A, there is shown an input multi-pixel data stream 964, a distributor control 903a, a phase accumulator control (PAC) 903c with a plurality of control logics 909a to 909d, a plurality of horizontal neighboring pixels $X_{3,0}$ 964aa to $X_{3,3}$ 964ad, a plurality of parallel horizontal scalers S0 929a to S1 929d, a plurality of output pixels $Y_{3,0}$ 974a, $Y_{3,1}$ 984a, $Y_{3,2}$ 994a and $Y_{3,3}$ 968a, a merge control 903b and an output multi-pixel data stream $Y_0 Y_1 Y_2$ to $Y_n$ 919.

The input pixel data stream 964 may comprise a sequence of pixels $X_0$ 964a to $X_n$ 964n read by the distributor control 903a. The distributor control 903a may comprise suitable logic, circuitry, and/or code that may enable control to replicate and broadcast a plurality of horizontal neighboring pixels such as pixels $X_{3,0}$ 964aa to $X_{3,3}$ 964ad to the scalers S0 929a to S1 929d. In an embodiment of the invention, the distributor control 903a may comprise memory or a multiplexer controlled by logic.

Each of the plurality of horizontal scalers such as scaler S0 929a may comprise an alignment buffer 931a, a scaler control 933a and an alignment buffer 935a. In an embodiment of invention, four horizontal scalers S0 929a to S3 929d, an alignment buffer 931a in scaler S0 929a may comprise a memory buffer with a tri-state logic or a shift register. The alignment buffer 931a may allow the input data such as pixels $X_{4,0}$ to $X_{4,3}$ to be out of sync The alignment buffer 931a may also keep the next four pixels $X_{3,0}$ 964aa to $X_{3,3}$ 964ad ready so that they may be pushed into the scaler data paths 932a to 932d, (whenever the data path 932a to 932d may be ready to accept pixel data). In other words, it may ensure that clock cycles are not wasted in aligning the pixels $X_{3,0}$ 964aa to $X_{3,3}$ 964ad for a scaling up operation.

A phase accumulator PAC 903c and the respective control logic 909a to 909d associated with each of the data paths 932a to 932d may derive information on how many input pixels are required to be shifted in, and may accept those many pixels from the alignment buffers 931a to 931d.

The Scalers S0 929a to S1 929d may each comprise a FIR filters to perform scaling functions described in FIG. 4A. The outputs from scalers S0 929a to S1 929d may go to the an alignment buffer 935a to 935d due to out of sync caused by cumulative phase shifts and step size separations from scaler S0 929a to S1 929d. Each of the an alignment buffer 935a to 935d may comprise a buffer that may be required to provide buffering to avoid lockup/pipeline-stall conditions in the data paths 932e to 932h, particularly in a scale down operation with a scale down factor being a high numerical value.

In an alternate embodiment of the invention, the parallel horizontal scalers 929a to 929d may be configured to process vertical scaling with transposed pixel data from the input pixel data stream 964 using a plurality of buffers to transpose data for after horizontal scaling.

Figure 9B:
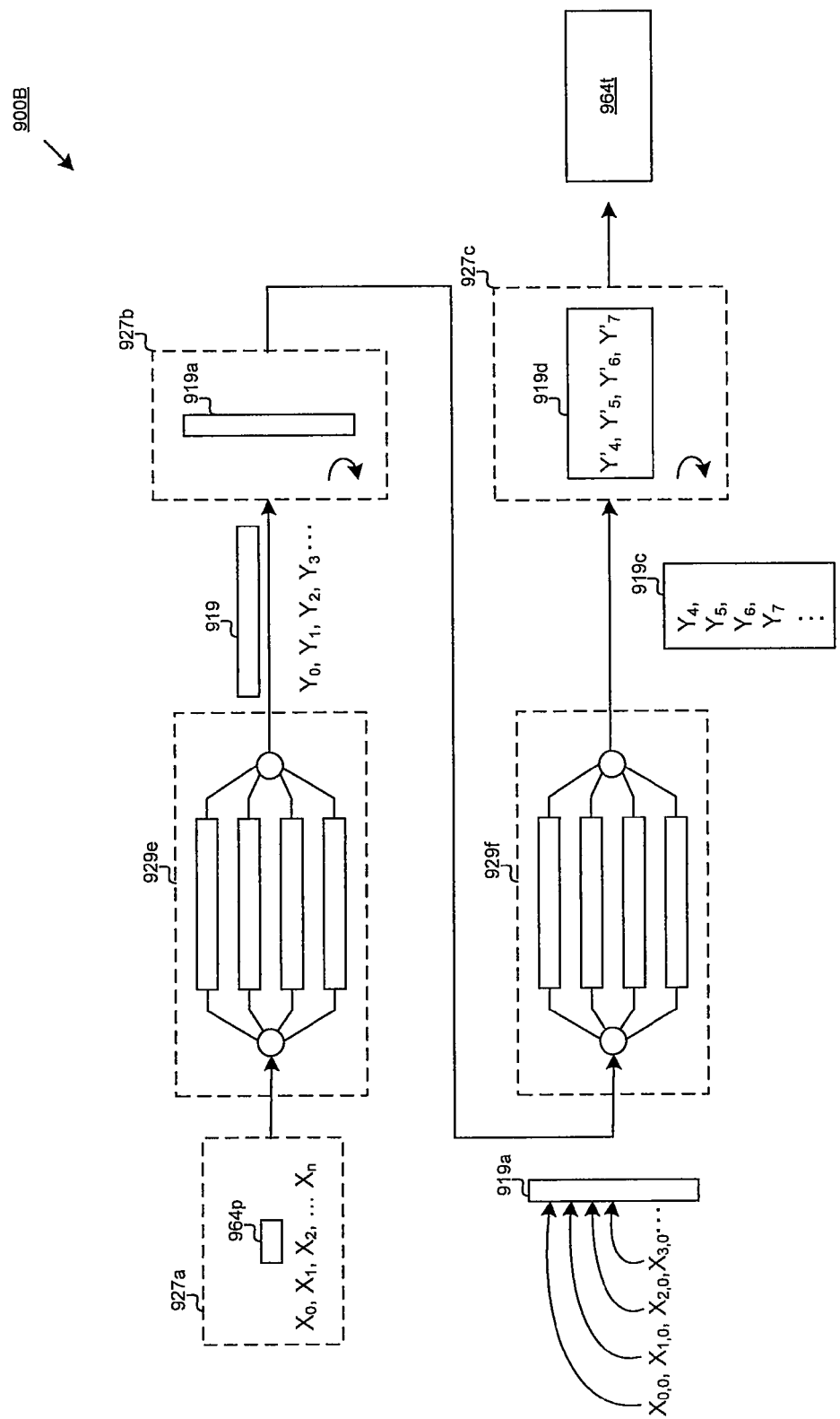
FIG. 9B is a is a block diagram that illustrates exemplary use of four horizontal scalers for both horizontal and vertical scaling in a multi-pixel memory to memory compositor system, in accordance with an embodiment of the invention.

FIG. 9B is a block diagram that illustrates exemplary use of four horizontal scalers for both horizontal and vertical scaling in a multi-pixel memory to memory compositor system 900B, in accordance with an embodiment of the invention. Refer to FIG. 9B, there is shown pictorially that the operations of FIG. 9A may be cascaded with a second buffer 927b to transposed output 919, a second horizontal scalers 929e to 929h and a third buffer 927c to transpose output 919c to generate an image 964t that is symmetrically scaled four times vertically and horizontally.

An image may be stored as pixel data 964. The pixel data 964 may be read by a first buffer 927a and sent as a sequential pixel data streams $X_0$ to $X_n$ to be read by a first four horizontal scalers 929a to 929d. The first four horizontal scalers 929a to 929d may horizontally scale the pixel data streams $X_0$ to $X_n$ 964 with a scaling factor, in this illustration quadrup ling the horizontal dimension as first horizontally scaled output pixel data streams $Y_0$ to $Y_3$ 919. The first horizontally scaled output pixel data streams $Y_0$ to $Y_3$ 919 may be read by a second buffer 927b and be transposed as input pixel data streams $X_{0,0}$ to $X_{3,0}$ 919a.

The transposed input pixel data streams $X_{0,0}$ to $X_{3,0}$ 919a may be read by a second four horizontal scalers 929e to 929h and be horizontally scaled a second time to a twice horizontally scaled transposed output pixel data streams $Y_4$ to $Y_7$ 919c. The twice horizontally scaled transposed output pixel data streams $Y_4$ to $Y_7$ 919c may be read by a third buffer 927f where a second transposition may take place to generate a twice horizontally scaled, twice transposed output pixel data streams $Y'_4$ to $Y'_7$ 919d. Since the pixel data leaving the second horizontal scalers 929e to 929h may have already been merged, the third buffer 927f may output a single image 964t with a symmetrically scaled by four times image 964t both vertically and horizontally.

Figure 10:
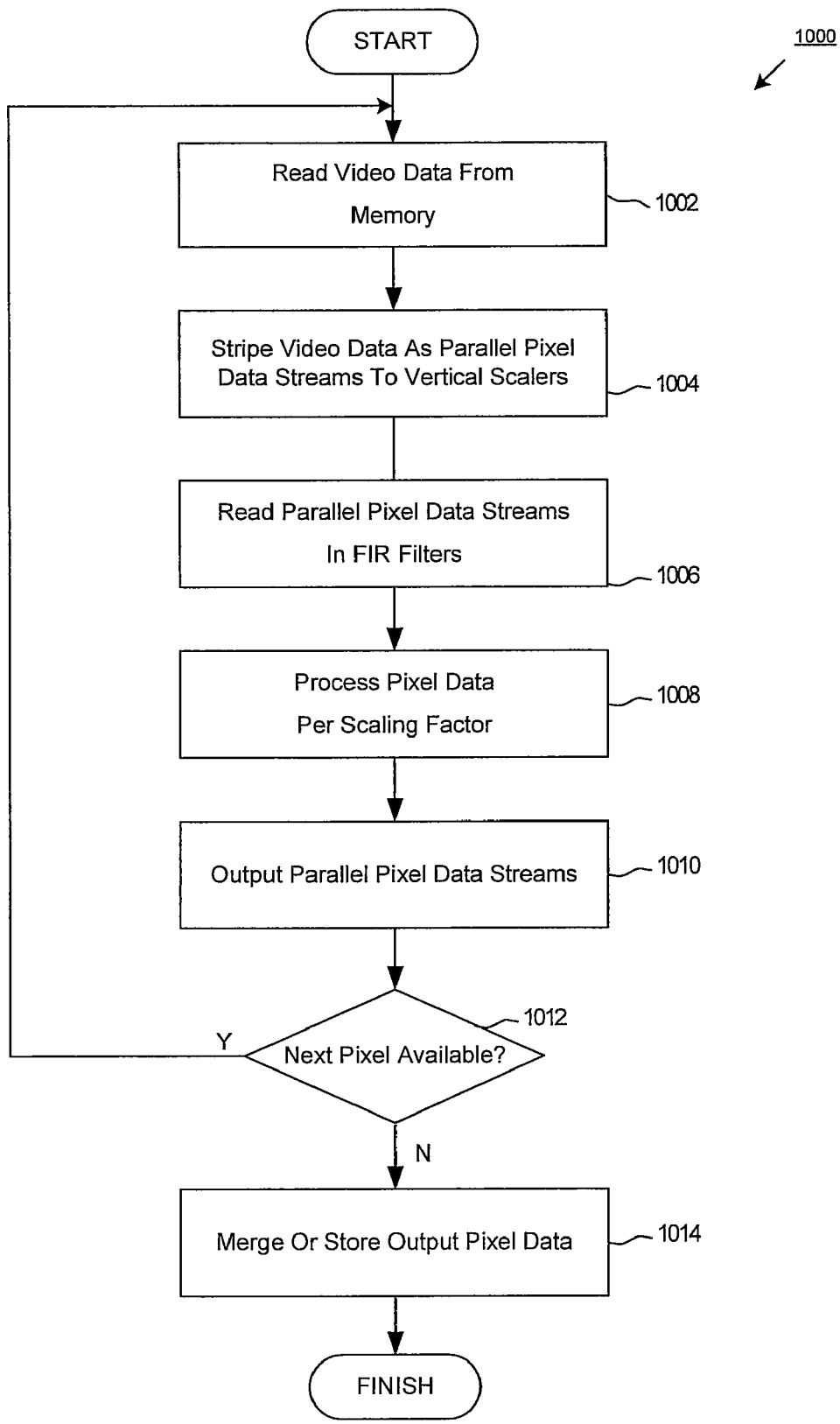
FIG. 10 is a flow chart that illustrates exemplary steps for vertical scaling of a multi-pixel memory to memory compositor system, in accordance with an embodiment of the invention.

FIG. 10 is a flow chart that illustrates exemplary steps for vertical scaling of a multi-pixel memory to memory compositor system, in accordance with an embodiment of the invention. Reference designations of FIGS. 4A to 4B may be referred to at various steps in the flow chart method 1000. At step 1002, read video data from memory. Video data 414a may be read into SBFL 427a. At step 1004, stripe video data as parallel pixel data streams to vertical scalers. The SBFL 427a may stripe the video data 414a into a plurality of parallel pixel data streams $X_0$ 414a to $X_3$ 414d to be sent to a plurality of parallel vertical scalers S0 429a to S3 429d. Each of the pixel data streams may comprise a plurality of pixel data, for example $X_{0,0}$ to $X_{5,0}$ for pixel data stream $X_0$ 414a.

At step 1006, parallel pixel data streams may be read into the in FIR filters. Each of the FIR filters in the plurality of parallel vertical scalers S0 429a to S3 429d may read the plurality of pixel data from respective parallel pixel data streams $X_0$ 414a to $X_3$ 414d. At step 1008, pixel data may be processed per A scaling factor, the latter of which may be read from a user input or from a preprogrammed value. The scaling factor may determine the step size of the output pixels for scaling up or scaling down. An output $Y_0$ 418a may be generated based on the vertical neighboring pixel data $X_{0,0}$ to $X_{5,0}$ in the pixel data stream $X_0$ 414a.

At step 1010, output parallel pixel data streams may be generated. Each of the parallel outputs $Y_0$ 418a to $Y_3$ 418d may comprise a sequence of scaled pixel data. Step 1012 determines if a next pixel may be available. The logic control 405a from a phase accumulator control (not shown in FIG. 4A) may continue to stripe video data 414a for vertical scaling by returning to step 1002 until the vertical scaling process may be completed. At step 1014, the output pixel data from the plurality of parallel data streams may be merged and output as a scaled image or stored in a memory buffer.

In another embodiment, step 1002 may be modified to read transposed first vertically scaled video data 414b into a second SBFL 427b. The second SBFL 427b may stripe the transposed pixel data streams $X_0$ 414f to $X_3$ 414j such that horizontal scaling may be achieved using vertical scalers S0 429e to S3 429h as shown in FIG. 4B.

Figure 11:
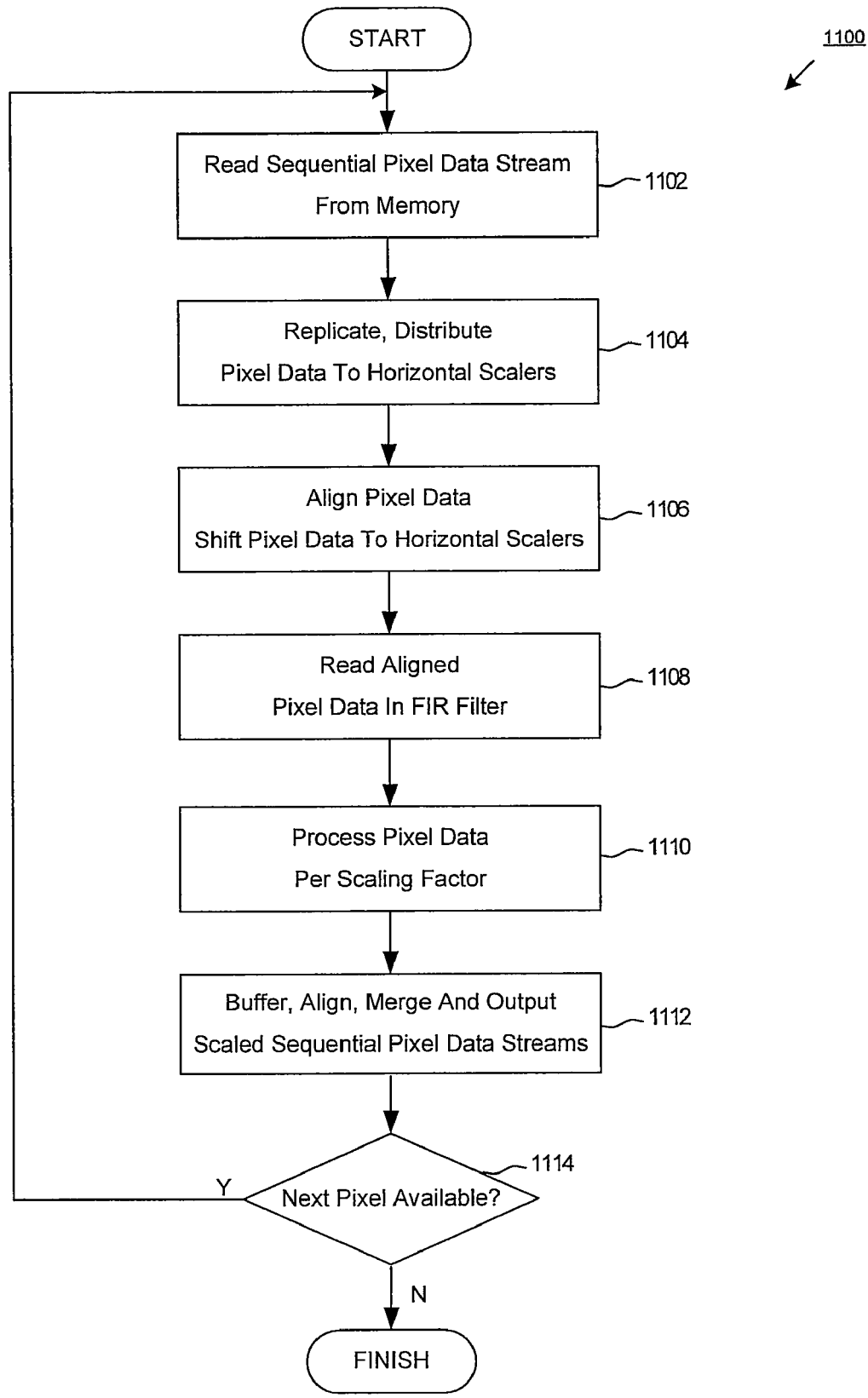
FIG. 11 is a flow chart that illustrates exemplary steps for horizontal scaling of a multi-pixel memory to memory compositor system, in accordance with an embodiment of the invention.

FIG. 11 is a flow chart that illustrates exemplary steps for horizontal scaling of a multi-pixel memory to memory compositor system, in accordance with an embodiment of the invention. Reference designations of FIG. 9A may be referred to at various steps in the flow chart or method 1100. At step 1102, sequential pixel data stream may be read from memory. Video data as sequential pixel data stream 964 may be read into a memory buffer, such as a buffer with distributor control 903a. At step 1104, pixel data may be replicated, distributed, and aligned to horizontal scalers. The distributor control 903a may replicate each incoming pixel $X_0$ 964a to $X_n$ 964n in the sequential pixel data stream 964 into a plurality of identical pixels $X_{3,0}$ 964aa to $X_{3,3}$ 964ad to be distributed to a plurality of parallel horizontal scalers S0 929a to S3 929d.

At step 1106, the pixel data may be aligned, and shifted to horizontal scalers. To facilitate horizontal scaling operation in horizontal scalers S0 929a to S3 929d, the replicated pixel data $X_{3,0}$ 964aa to $X_{3,3}$ 964ad may need to arrive the scalers S0 929a to S3 929d at different time or different pixel clock cycles explained in FIG. 9A. The alignment buffer 931a to 931d may accommodate pixel data to be out of syn by a determined number of pixels. When any of the horizontal scalers S0 929a to S3 929d may be ready to process pixel, the alignment buffers 931a to 931d may shift the pixel data in.

At step 1108, the aligned pixel data may be read in FIR filter. Each of the FIR filters may read in a respective aligned pixel data to be processed along with other aligned horizontal neighbor pixels exist in the respective FIR filter. If no new aligned pixel data may be read, existing aligned pixel data in the FIR filter may be reused for processing. At step 1110, pixel data may be processed per a scaling factor. The respective FIR filter in each of the horizontal scalars may perform scaling operation on the aligned pixel data per a defined scaling factor. The scaling factor may be defined by a user or from a preprogrammed value.

At step 1112, output scaled sequential pixel data streams may be buffered, aligned, and merged. The scaled outputs may have different phase angles and different step size separations depending on the value of scaling factor and the number of horizontal scalers used. To avoid a lock up/pipeline stall condition in the horizontal scalars, the output pixel data may be buffered with an alignment buffer 935a to 935d so that a new pixel may be read by any of the horizontal scalers. The output from the ping-pong module may be aligned and merged into a scaled sequential pixel data stream.

Step 1114 may determine whether a next pixel may be available or a next output needs to be produced. The logic control 909a to 909d from a phase accumulator control (not shown in FIG. 9A) may continue to read sequential pixel data stream 964 for horizontal scaling by returning to step 1102 until the horizontal scaling process may be completed.

In an alternate embodiment of the invention, step 1102 may be modified to read transposed first horizontally scaled sequential pixel data from a second memory buffer. The second memory buffer map the transposed pixel data vertically such that vertical scaling may be achieved using horizontal scalers S0 929a to S3 929d.

In accordance with various embodiments of the invention, the method 1000 and 1100, and system 400A to 400c and 900 A to 900B for processing video data using multi-pixel scaling in a memory system are provided. The multi-pixel scaling using the method or program may include reading pixel data for one or more data streams from the memory system into one or more scalers, wherein each of the plurality of data streams includes a plurality of pixels, scaling the pixel via the one or more scalers and outputting the scaled pixels from the one or more scalers. Pixel data may be sequential 964 or parallel 414a to 414d. The plurality of scalers S0 to $S_3$ 429a to 429d or 929a to 929d may be in parallel, scaling sequential pixel data 964 with independent phase control logic 909a to 909d, or scaling parallel pixel data in substantially equal phase control logic 505a or 505b.

Vertically scaled and transposed pixel data 414m, 414n, 414t, may be further read and scaled by vertical scalers S0 to $S_3$ 429a to 429d. The output generated from the scalers may be transposed and merged together as a symmetrically scaled image 414h. Horizontally scaled and transposed pixel data 919a may be further read and scaled by horizontal scalers 929f. The outputs may be aligned and merged as pixel data 919c. The output pixel data 919c may be further transposed to pixel data 919d and may be displayed as a symmetrically scaled image 964t. Scaling may comprise interpolation or sub sampling using pixel phase angle φ, position n, step size s and scaler quantities N.

Accordingly, the present invention may be realized in hardware, software, or a combination of hardware and software. The present invention may be realized in a centralized fashion in at least one computer system or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for processing video data, the method comprising:
    striping pixel data from a buffer into a plurality of data streams, wherein each of said plurality of data streams comprises a plurality of pixels;
    scaling, in parallel, said plurality of pixels from each of said plurality of data streams, utilizing a corresponding plurality of scalers; and
    outputting, in parallel, said scaled plurality of pixels from each of said corresponding plurality of scalers.

2. The method according to claim 1, wherein said pixel data comprises sequential pixel data.

3. The method according to claim 2, comprising replicating said sequential pixel data prior to said scaling.

4. The method according to claim 3, comprising distributing adjacent sequential pixel data associated with said replicated sequential pixel data subsequent to said scaling.

5. The method according to claim 1, comprising merging said scaled plurality of pixels from each of said corresponding plurality of scalers into a single output data stream.

6. The method according to claim 1, wherein said pixel data comprises parallel pixel data.

7. The method according to claim 1, comprising aligning said plurality of pixels from each of said plurality of data streams prior to said scaling.

8. The method according to claim 1, comprising aligning said scaled plurality of pixels from each of said corresponding plurality of scalers.

9. The method according to claim 1, comprising scaling said pixel data utilizing independent phase control interpolation in each of said corresponding plurality of scalers.

10. The method according to claim 9, wherein said independent phase control interpolation utilizing parameters comprising: a pixel phase angle, a step size, a pixel position of said pixel data and a numerical quantity of said corresponding plurality of scalers.

11. The method according to claim 1, wherein said scaling of said pixel data comprises in-phase control interpolation.

12. The method according to claim 1, comprising managing reading of said pixel data from said buffer using stripe buffer filling logic.

13. The method according to claim 1, comprising transposing said pixel data from a memory system prior to said scaling.

14. A system for processing video data, the system comprising:
    one or more circuits, said one or more circuits being operable to stripe pixel data from a buffer into a plurality of data streams, wherein each of said plurality of data streams comprises a plurality of pixels;
    a corresponding plurality of scalers operable to scale in parallel, said plurality of pixels from each of said plurality of data streams; and
    said one or more circuits being operable to output in parallel said scaled plurality of pixels from each of said corresponding plurality of scalers.

15. The system according to claim 14, wherein said pixel data comprises sequential pixel data.

16. The system according to claim 15, wherein said one or more circuits replicates said sequential pixel data prior to said scaling.

17. The system according to claim 16, wherein said one or more circuits distributes adjacent sequential pixel data associated with said replicated sequential pixel data subsequent to said scaling.

18. The system according to claim 14, wherein said one or more circuits merges said scaled plurality of pixels from each of said corresponding plurality of scalers into a single output data stream.

19. The system according to claim 14, wherein said pixel data comprises parallel pixel data.

20. The system according to claim 14, wherein said one or more circuits aligns said plurality of pixels from each of said plurality of data streams prior to said scaling.

21. The system according to claim 14, wherein said one or more circuits aligns said scaled plurality of pixels from each of said corresponding plurality of scalers.

22. The system according to claim 14, wherein said each of said corresponding plurality of scalers scales said pixel data utilizing independent phase control interpolation in each of said corresponding plurality of scalers.

23. The system according to claim 22, wherein said independent phase control interpolation utilizing parameters comprising: a pixel phase angle, a step size, a pixel position of said pixel data and a numerical quantity of said corresponding plurality of scalers.

24. The system according to claim 14, wherein said corresponding plurality of scalers scales said pixel data utilizing in-phase control interpolation.

25. The system according to claim 14, wherein said one or more circuits manages reading of said pixel data from said buffer using stripe buffer filling logic.

26. The system according to claim 14, wherein said one or more circuits transposes said pixel data from a memory system prior to said scaling.

27. A non-transitory computer-readable medium having stored thereon, a computer program having at least one code section for processing video data, the at least one code section being executable by a computer for causing the computer to perform steps comprising:
    striping pixel data from a buffer into a plurality of data streams, wherein each of said plurality of data streams comprises a plurality of pixels;
    scaling, in parallel, said plurality of pixels from each of said plurality of data streams, utilizing a corresponding plurality of scalers; and
    outputting, in parallel, said scaled plurality of pixels from each of said corresponding plurality of scalers.

28. The method according to claim 1, comprising performing one or more operations of: color keying, color conversion, blending or raster operation on said plurality of pixel streams.

29. The system according to claim 14, wherein said one or more circuits perform one or more operations of: color keying, color conversion, blending or raster operation on said plurality of pixel streams.

30. The non-transitory computer-readable medium according to claim 27, wherein said at least one code section comprises code for performing one or more operations of: color keying, color conversion, blending or raster operation on said plurality of pixel streams.

* * * * *

UNITED STATES PATENT AND TRADEMARK OFFICE
CERTIFICATE OF CORRECTION

PATENT NO. : 8,195,008 B2  
APPLICATION NO. : 11/770230  
DATED : June 5, 2012  
INVENTOR(S) : Pande et al.

Page 1 of 1

It is certified that error appears in the above-identified patent and that said Letters Patent is hereby corrected as shown below:

Column 6, line 67, replace the word "pixels" with the word --pixel--

Column 21, line 40, replace the word "utilizing" with the word --utilizes--

Column 22, line 25, replace the word "utilizing" with the word --utilizes--

Signed and Sealed this
Twenty-eighth Day of August, 2012

David J. Kappos
*Director of the United States Patent and Trademark Office*